(12) United States Patent
Bryan et al.

(10) Patent No.: US 7,746,969 B2
(45) Date of Patent: Jun. 29, 2010

(54) HIGH DEFINITION MULTI-MEDIA INTERFACE

(75) Inventors: Thomas Bryan, San Diego, CA (US);
Stewart Webb, San Diego, CA (US);
Peter Sallaway, San Diego, CA (US);
Tulsi Manickam, San Diego, CA (US);
Sreen Raghavan, La Jolla, CA (US)

(73) Assignee: Entropic Communications, Inc., San Diego, CA (US)

( * ) Notice: Subject to any disclaimer, the term of this patent is extended or adjusted under 35 U.S.C. 154(b) by 571 days.

(21) Appl. No.: 11/391,903

(22) Filed: Mar. 28, 2006

(65) Prior Publication Data

US 2007/0230640 A1    Oct. 4, 2007

(51) Int. Cl.
*H04B 1/10* (2006.01)

(52) U.S. Cl. .................... 375/349; 375/219; 375/229; 375/344; 375/345

(58) Field of Classification Search ............... 375/219, 375/229, 344, 345, 316, 349
See application file for complete search history.

(56) References Cited

U.S. PATENT DOCUMENTS

| | | | |
|---|---|---|---|
| 5,541,556 A | 7/1996 | Francis | |
| 5,953,069 A | 9/1999 | Bruins et al. | |
| 6,111,445 A * | 8/2000 | Zerbe et al. | 327/231 |
| 6,154,256 A | 11/2000 | Bruins | |
| 6,167,080 A * | 12/2000 | Hee et al. | 375/232 |
| 6,307,543 B1 | 10/2001 | Martin | |
| 6,463,092 B1 | 10/2002 | Kim et al. | |
| 6,501,792 B2 | 12/2002 | Webster | |
| 6,618,436 B2 * | 9/2003 | Greiss et al. | 375/229 |
| 6,795,494 B1 * | 9/2004 | Phanse et al. | 375/219 |
| 6,798,832 B1 * | 9/2004 | Nakata et al. | 375/233 |
| 6,816,970 B2 | 11/2004 | Morgan et al. | |
| 6,819,166 B1 | 11/2004 | Choi et al. | |
| 6,870,930 B1 | 3/2005 | Kim et al. | |
| 6,876,240 B2 | 4/2005 | Moon et al. | |
| 6,891,910 B2 | 5/2005 | Hwang et al. | |
| 6,897,793 B1 | 5/2005 | Kim et al. | |
| 6,914,637 B1 | 7/2005 | Wolf et al. | |
| 6,930,560 B2 | 8/2005 | Lee et al. | |

(Continued)

OTHER PUBLICATIONS

Notification of Transmittal of the International Search Report in corresponding International Application No. PCT/US07/07132 dated Apr. 28, 2008 (1 page).

(Continued)

*Primary Examiner*—David C Payne
*Assistant Examiner*—Leon Flores
(74) *Attorney, Agent, or Firm*—Bruce W. Greenhaus

(57) ABSTRACT

A receiver for a multi-channel system such as a HDMI system is presented. In accordance with the present invention, the receiver receives one of the plurality of channels and includes an analog portion, a digital-to-analog converter, and a digital control block that provides digital control signals to the analog portion. Equalization can be accomplished partially or wholly in the analog domain and digitally controlled by a digital control loop. A digital equalizer can also be included. A decision feedback equalizer can be implemented that sums an analog output signal into the analog data stream. Timing recovery can be accomplished by digital control of a phase interpolator or delay locked loop that receives a plurality of phases from a timing circuit coupled to receive a clock signal.

1 Claim, 12 Drawing Sheets

U.S. PATENT DOCUMENTS

| | | | |
|---|---|---|---|
| 6,944,804 B1 | 9/2005 | Kim et al. | |
| 6,961,095 B2 | 11/2005 | Keating et al. | |
| 7,248,890 B1* | 7/2007 | Raghavan et al. | 455/522 |
| 2001/0021219 A1* | 9/2001 | Sasaki et al. | 375/222 |
| 2004/0008059 A1* | 1/2004 | Chen et al. | 327/112 |
| 2004/0190649 A1* | 9/2004 | Endres et al. | 375/326 |
| 2005/0195894 A1 | 9/2005 | Kim et al. | |
| 2006/0280240 A1* | 12/2006 | Kikugawa et al. | 375/229 |
| 2007/0286315 A1* | 12/2007 | Hong et al. | 375/345 |

OTHER PUBLICATIONS

International Search Report in corresponding International Application No. PCT/US07/07132 dated Apr. 28, 2008 (28 pages).

Written Opinion of the International Search Report in corresponding Interntional Application No. PCT/US07/07132 dated Apr. 28, 2008 (9 pages).

* cited by examiner

HIGH DEFINITION MULTI-MEDIA INTERFACE

BACKGROUND

1. Field of the Invention

The present invention is related to multi-media receivers and, in particular, to a multi-channel interface such as a high-definition multi-media interface.

2. Discussion of Related Art

High-definition multimedia is becoming increasingly common-place. Continuously, consumers are demanding greater levels of quality in multimedia entertainment. High-Definition Multimedia Interface (HDMI) refers to a technology that is being developed to allow the seamless transfer of uncompressed digital audio and video data between devices. HDMI is the first industry-supported, uncompressed, all-digital audio and video interface. HDMI is utilized to interface between devices such as digital set-top boxes, DVD players, and televisions, or any other device that transmit or receive digital audio and video data.

The HDMI standard supports standard, enhanced, and high-definition video, plus multi-channel digital audio on a single cable. Further, HDMI systems transmit all ATSC HDTV standards and can support 8-channel digital audio, with bandwidth to spare to accommodate future enhancements and requirements.

Conventionally, HDMI systems operate over a single cable through HDMI connectors, eliminating the need for the myriad of audio and video cables utilized in systems not utilizing HDMI technology. HDMI systems can support many formats of digital and non-digital television including high definition formats such as the 720p, 1080i, and 1080p formats. Baud rates in HDMI systems range from about 250 MHz to 1650 MHz. For data formats that do not require 250 MHz, pixel repetition is utilized to achieve the minimum 250 MHz baud rate. In addition, the HDMI technology is backwards compatible to the digital video interface (DVI) standard.

Conventional receivers for HDMI utilize an analog approach, equalizing with fixed equalization from a limited set of choices and providing for gross timing recovery from another set of limited choices. For example, it is not uncommon to have sets of three options for equalization and for timing recovery. This approach severely limits the performances of these receivers because of the inability to adapt to the operating environment of the system. This inability can become apparent in harsh environments, such as large attenuation across the cable or large amounts of timing jitter, or if the environment is changing due to, for example, temperature fluctuations or changes in the channel properties. Changes in channel properties can also occur, for example, through human interactions.

The lack of equalization options limits the ability of these receivers to provide the optimum amount of channel equalization, leading to significant degradation of the signal-to-noise ratio (SNR) of the receiver. Minimal timing recovery options limit the amount of jitter that the receiver can track and correct, further leading to a degradation of the performance of the receivers. Together, these issues lead to an increased bit-error rate (BER), limit the cable length over which the receiver can successfully operate, and limit the ability of the receiver to cope with poor connectors and low quality board materials.

Therefore, there is a need for better performing receivers to receive data over multi-channel systems.

SUMMARY

In accordance with the present invention, a receiver in a multi-channel receiver system is presented. As such, a receiver in a multi-channel receiver system includes an analog portion coupled to receive a signal from one of a plurality of data channels, an analog-to-digital converter coupled to digitize an output signal from the analog portion; and a digital control block coupled to digitally control the analog portion. A multi-channel receiver system includes a plurality of receivers according to the present invention. Additionally, in some embodiments a multi-channel receiver system includes a clock signal channel as well as a plurality of data channels.

In some embodiments, the receiver can include a decision slicer coupled to receive a signal from the analog-to-digital converter and generate a decided symbol. Further, the digital control block can include a digital equalizer coupled to receive a signal from the analog-to-digital converter. Additionally, the digital control block can include a deserializer coupled to receive a signal from the analog-to-digital converter.

In some embodiments, the analog portion includes an analog equalizer and the digital control block implements an analog equalizer control loop that provides digital control signals to the analog equalizer. In some embodiments, the analog equalizer includes a plurality of equalizer stages, each of which is digitally controlled by the analog equalizer control loop. In some embodiments, each of the plurality of equalizer stages includes a plurality of frequency responses that are switchably included in the equalization in response to the digital control signals. In some embodiments, each of the plurality of frequency responses are digitally controlled by the analog equalizer control loop. In some embodiments, the analog equalizer control loop implements a loop equation and utilizes a thermometer code that is mapped onto operation of the analog equalizer.

In some embodiments, the receiver can include a decision feedback equalizer coupled to receive an output signal from the analog-to-digital converter and sum an analog signal with an output signal of the analog equalizer, the decision feedback equalizer coupled to receive digital control signals from a decision feedback equalizer loop implemented in the digital control block.

In some embodiments, the analog portion includes a gain stage to be digitally controlled by a gain stage loop implemented in the digital control block. In some embodiments, the gain stage adjusts reference voltages in the analog-to-digital converter in accordance with digital control signals from the digital control block. In some embodiments, the gain stage amplifies a signal according with digital control signals from the digital control block and provides an output signal to the analog-to-digital converter.

In some embodiments, the analog-to-digital converter includes at least one comparator that compares an analog signal with a signal produced by a voltage reference, the voltage reference controlled by digital signals produced in the digital control block. In some embodiments, the at least one comparator of the analog-to-digital converter includes a middle slicer, a minimum slicer, a maximum slicer, and an adjustable slicer. In some embodiments, the adjustable slicer is utilized to monitor operation of the receiver.

In some embodiments, the receiver further includes a phase block coupled to receive a plurality of phase signals and provide a sampling clock signal to the analog-to-digital converter, the phase block coupled to receive digital control signals from the digital control block. In some embodiments, the plurality of phase signals are generated by a timing circuit coupled to receive a data clock signal. In some embodiments, the timing circuit is a phase-locked loop. In some embodiments, the phase block is a delay-locked loop. In some embodiments, the phase block is a phase interpolator. In some embodiments, the phase interpolator includes a plurality of current amplifiers, each of the current amplifiers receiving a corresponding one of the plurality of phase signals; and a plurality of digitally switched current sources coupled to each of the plurality of current amplifiers, the digitally switched current sources coupled to receive the digital control signals.

A method of receiving data in a multi-channel system according to the present invention includes receiving one of a plurality of data channels into an analog portion; digitizing an output signal of the analog portion; determining a received signal and error from the digitized output signal; and digitally controlling the analog portion. In some embodiments, the method further includes equalizing the digitized output signal digitally. In some embodiments, the method further includes equalizing the plurality of data channels in the analog portion and digitally controlling the equalization. In some embodiments, the equalizing includes providing multiple stages of analog equalization. In some embodiments, digitally controlling the equalization includes providing an implementation of a digital control loop.

In some embodiments, the method further includes timing recovery. In some embodiments, providing timing recovery includes providing a plurality of phase signals to a phase block; digitally adjusting the phase in the phase block; and providing a sampling signal to the digitizer. In some embodiments, providing a plurality of phase signals includes receiving a data clock signal and determining the plurality of phase signals. In some embodiments, digitally adjusting the phase includes implementing a digital control loop.

These and other embodiments are further discussed below with respect to the following figures.

In the figures, elements having the same designation have the same or similar functions.

DETAILED DESCRIPTION

A receiver system according to some embodiments of the present invention can be utilized for transmissions between integrated circuit chips. In some embodiments, the receiver can receive multiple streams of data. The receiver then recovers the data and the clock signal from each data stream and provides clock and data signals from each data stream to the remainder of the integrated circuit chip or set of chips. Although the example disclosed herein is most applicable to HDMI applications, transceivers according to the present invention can also find applicability to any serial backplane applications, wired communication including HDMI, HDTV, and Fiber Channel, or optical communications systems including Sonet and Ethernet.

The optimum clock signals corresponding to each of the data streams may vary from one another in both phase and frequency, although in an HDMI system there is only a phase offset. Further, the frequency of the optimum clock signals for receipt of data from each data stream may vary from the nominal frequency of the transmission.

Figure 1:
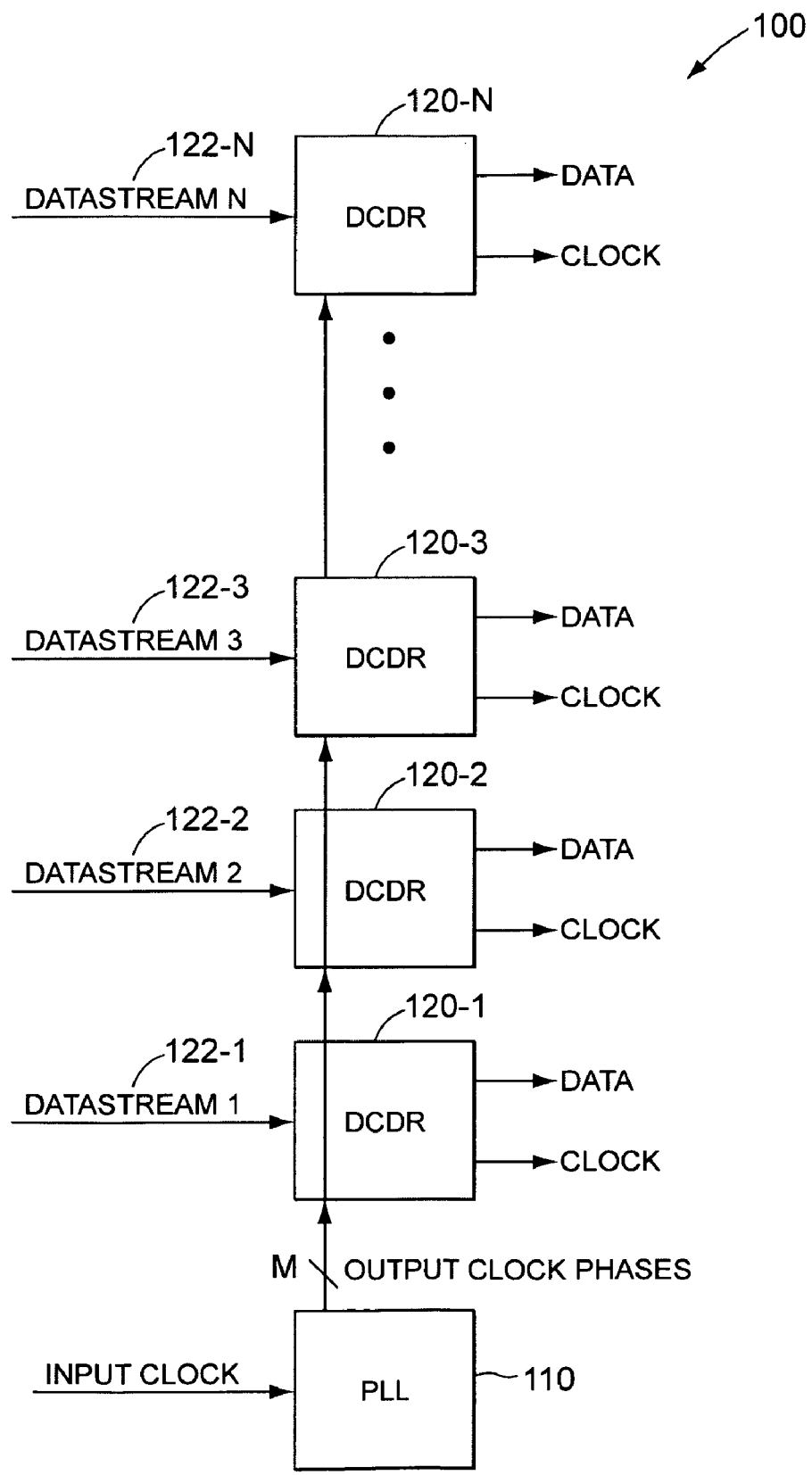
FIG. 1 illustrates a multi-channel data receiver according to some embodiments of the present invention.

FIG. 1 illustrates a block diagram of a receiver system 100 according to the present invention. Receiver system 100, for example, can be implemented on an integrated circuit with multiple data streams input on multiple pins of the integrated circuit. Receiver system 100 includes a plurality of digital clock and data recovery (DCDR) circuits 120-1 through 120-N. Each of the DCDR circuits 120-1 through 120-N receives a corresponding one of data streams 122-1 through 122-N. In the embodiment shown in FIG. 1, a single timing circuit 110 is coupled to each of DCDR circuit 120-1 through 120-N in order to provide timing signals to DCDR circuit 120-1 through 120-N. Timing circuit 110 can include a phase-locked loop (PLL), a delay-locked loop (DLL), or some other method of recovering the incoming clock. Further, data streams 122-1 through 122-N may be carried by a single transmission line or by differential pairs of transmission lines.

As shown in the embodiment of receiver system 100 shown in FIG. 1, timing circuit 110 generates a plurality of clock signals corresponding to M phases of a clock signal. The clock signal can be based on a timing reference input to timing circuit 110. The timing reference, or input clock, input to timing circuit 110 can be input to the integrated circuit that includes receiver system 100 or may be generated on the integrated circuit. In systems such as HDMI, the input clock comes across the cable in parallel with the incoming data. Additionally, the frequency of the timing reference can correspond to the nominal transmission frequency of data streams 122-1 through 122-N, as is the case with HDMI.

The frequency of the clock signal, then, can be related to the transmission frequency of data streams 122-1 through 122-N. M phases of the clock signal are input to DCDR 120-1 through 120-N. The frequency of the clock phase signals can be nearly synchronous with the transmission frequency of data streams 122-1 through 122-N, or completely synchronous as in HDMI. In embodiments where there is not a synchronous clock input, the clock signals produced by timing circuit 110 may not be the same frequency as data streams 122-1 through 122-N, but may be within some percentage (e.g. about 1%) of the clock frequency of the data in data streams 122-1 through 122-N. In some embodiments, the input clock signal to timing circuit 110 can be produced locally (e.g., on the integrated circuit that contains receiver 100). In some embodiments, the input clock signal to timing circuit 110 can be determined from one of data streams 122-1 through 122-N. In some embodiments, the input clock signal to timing circuit 110 is input to the integrated circuit that contains receiver 100. In systems where the frequency range is very large (input clock frequency from 25 MHz to 165 MHz in HDMI, which is one tenth the baud rate of the data), use of the input clock signal for timing recovery allows timing circuit 110 to produce a clock that is close to the frequency (or at the frequency) of the data, simplifying the design of the timing recovery in each of DCDR 120-1 through 120-N.

As shown in FIG. 1, the M clock signals produced by timing circuit 110 are provided to DCDR 120-1 through 120-N. DCDR 120-1 through 120-N utilizes the M clock signals from timing circuit 110 to extract the clock and data from each of data streams 122-1 through 122-N. Further, in some embodiments, DCDR 120-1 through 120-N can deserialize the recovered data and adjust the clock accordingly to provide a low-speed multiple bit (i.e., parallel) data stream and lower speed clock corresponding to each of high-speed data streams 122-1 through 122-N. The low-speed, parallel data streams can then be utilized and processed by standard VLSI logic.

Figure 2A:
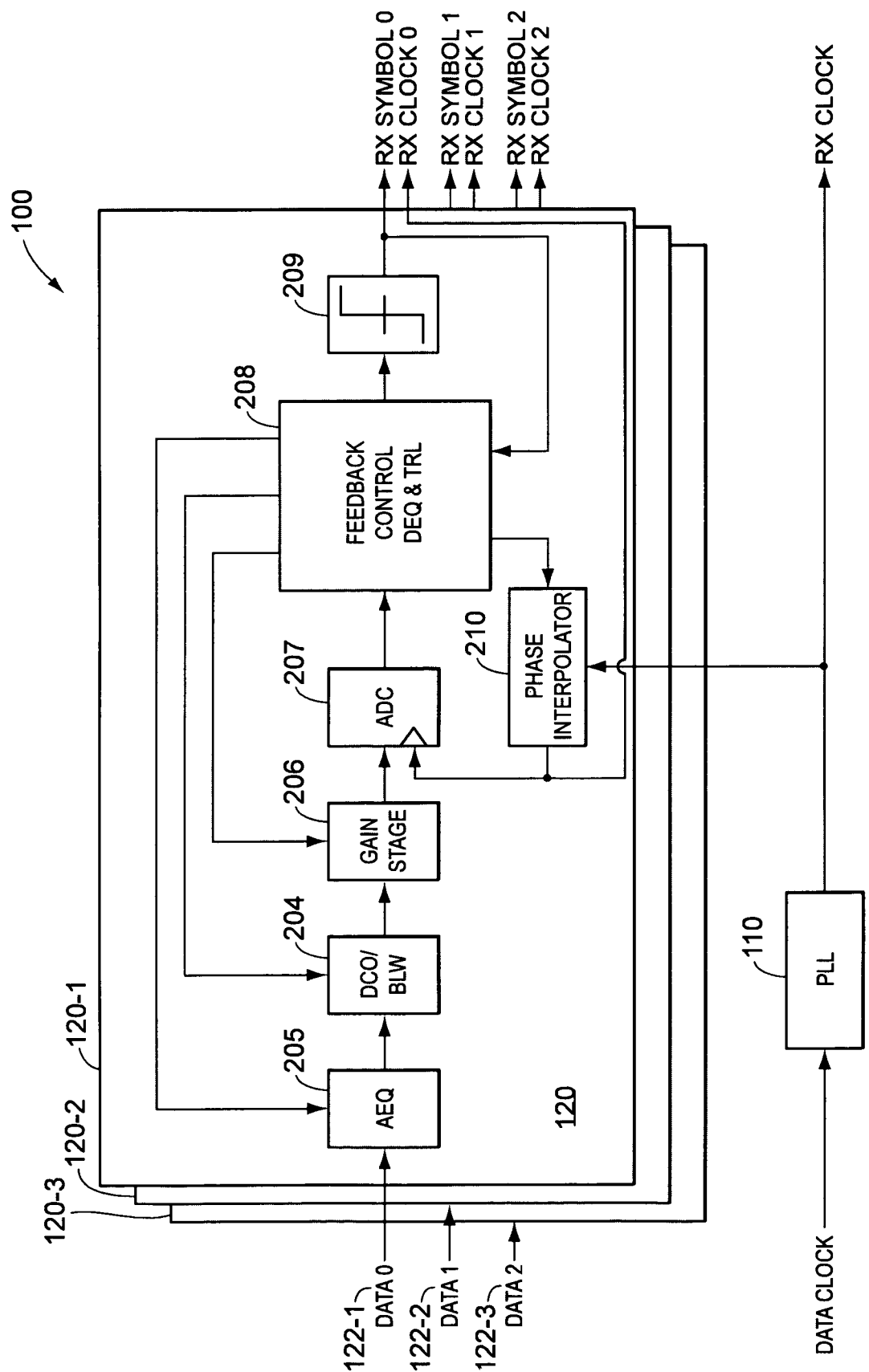
FIG. 2A illustrates a multi-channel receiver according to some embodiments of the present invention.

FIG. 2A shows an embodiment of receiver 100 illustrating an embodiment of channel receiver 120-1. As shown in FIG. 2A, receiver 100 includes receiver 120-1, receiver 120-2, and receiver 120-3 for receiving Data 0 from data stream 122-1, Data 1 from data stream 122-2, and Data 2 from data stream 122-3, respectively. As shown in FIG. 1, receiver 100 can include any number of DCDRs to receive data from any number of data streams (alternatively referred to herein as data channels). Receiver 100 can also include a timing circuit 110, which can be a PLL, that receives an independent clock signal Data Clock.

In FIG. 2A, one channel receiver, channel receiver 120-1 (or simply receiver 120), is illustrated. Channel receivers 120-2 and 120-3 can be substantially the same as that illustrated for channel receiver 120. As shown in channel receiver 120, Data 0 is received into analog equalizer (AEQ) 205. AEQ 205 is coupled to dc-offset (DCO) and base-line wander (BLW) block 204. The output signal from BLW 204 is input to gain stage 206, which is also coupled to ADC 207. In general, the order of AEQ 205, BLW 204 and gain stage 206 can vary from that shown in FIG. 2A. The digitized signal from ADC 207 is then input to control block 208. An output signal from control block 208 is input to slicer 209, which provides an output signal from channel receiver 120. In the embodiment shown in FIG. 1, a data clock signal is input to phase-locked loop (PLL) 110, which provides a signal to phase block 210. Phase block 210 provides a sampling clock signal for receiving Data 0 to ADC 207, and can be, for example, a phase interpolator or a delay locked loop (DLL). In systems where the input clock is not synchronous with the incoming data, phase block 210 can perform frequency recovery as well as phase recovery. However, in HDMI, only phase recovery is necessary.

As is shown in FIG. 2A, each stage of processing, whether analog or digital, is digitally controlled by control block 208, which can execute digital control loops that adaptively control the stage. In other words, AEQ 205, DCO/BLW block 204, gain stage 206, and phase block 210 can be precisely controlled by digital control loops that are executed in control block 208. Digitally controlling each of the stages of channel receiver 120 can provide for more accurate equalization, timing recovery, and greatly improve the performance of receiver 120, and therefore of multi-channel receiver 100.

Figure 2B:
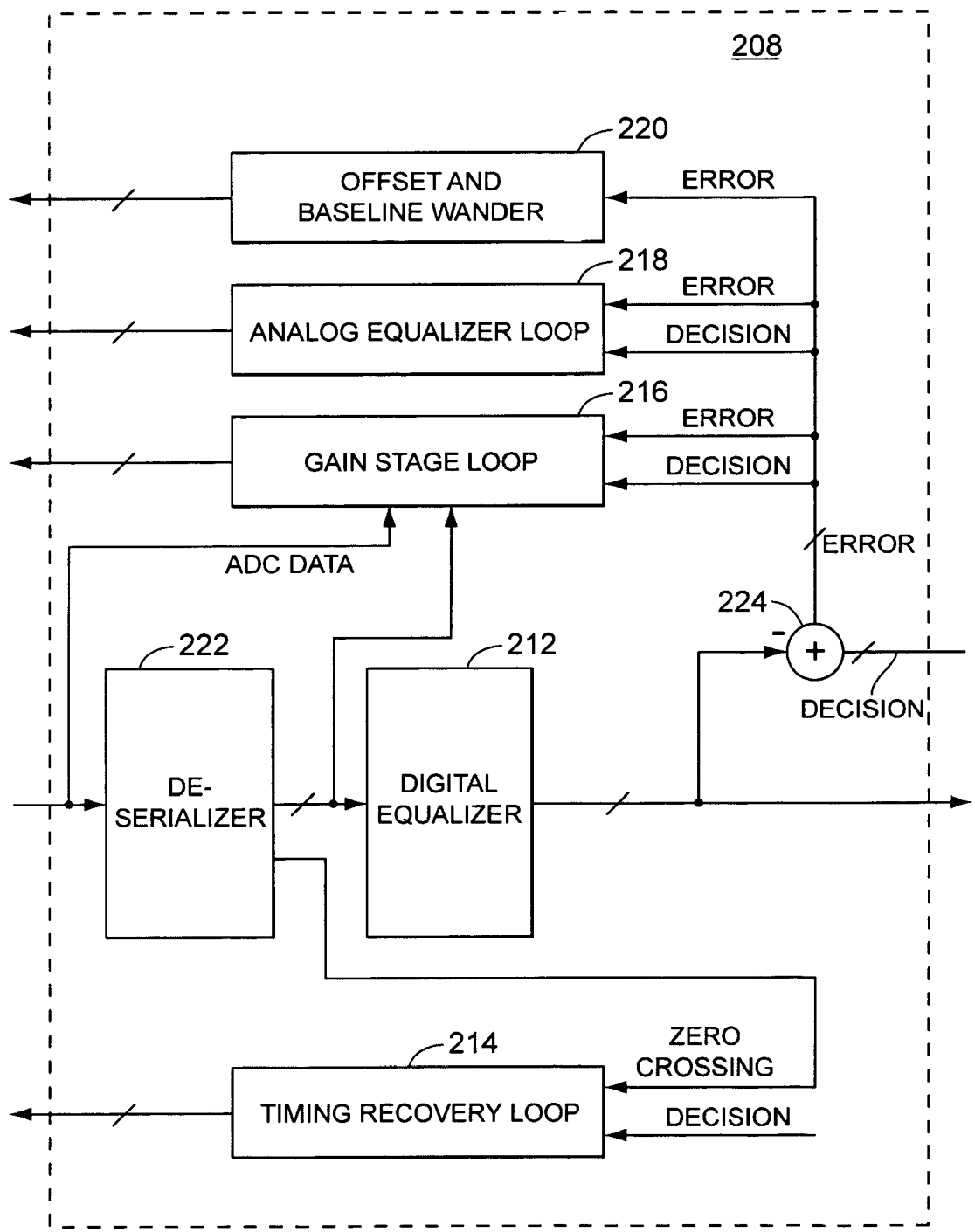
FIG. 2B illustrates an embodiment of the digital control block shown in FIG. 2A.

FIG. 2B illustrates an embodiment of control block 208. As shown in FIG. 2B, digital control block 208 includes feedback loops that provide digital control to each of DCO/BLW block 204, analog equalizer 205, gain stage 206, and phase block 210. As shown in FIG. 2B, serial data from ADC 207 can be deserialized in deserializer 222. In some embodiments, the output data from ADC 207 can itself be multi-bit. In some embodiments, the multi-bit output of ADC 207 can be deserialized. The output signal from deserializer 222 can be input to a digital equalizer 212. Deserializer 222 can also output a deserialized version of the zero_crossing sample, which can be a one-bit sample taken 180 degrees out of phase from the data sampling of ADC 207. The output data from digital equalizer 212 is output from data control 208 to slicer 209. The decision signal from slicer 209 is input to summer 224 along with the output signal from digital control block 208 in order that an error signal e is calculated. The decision and error signal can be utilized in digital feedback loops that are implemented in offset and baseline wander loop 220, analog equalizer loop 218, gain stage loop 216, and timing recovery loop 214. Example embodiments of these loops are further discussed below. Digital control block 208 can also fully adapt any equalization which is done within that block.

Although FIG. 2A shows an embodiment where frequency recovery is performed from a dedicated clock channel, in some embodiments timing recovery can be performed based on the data streams received in data channels themselves. Further, as discussed above, any number of channel receivers 120-1 through 120-N can be included in receiver 100 in order to accommodate any number of data channels. HDMI systems, for example, typically include three or six data channels with a single dedicated clock channel providing a data clock.

Some embodiments of receiver 120 as shown in FIG. 2A have several advantages over conventional receivers of this type. For example, embodiments of receiver 120 combine both analog and digital approaches. The utilization of digital control loops allows precise continuous control of the equalization process, whether the equalization is implemented in the analog domain, the digital domain, or in a combination of analog and digital domains. Digital control of the equalization leads to better equalization and therefore to a receiver with better performance.

Similarly, digital control loops can be utilized to control timing recovery. Additionally, utilization of a precise phase interpolator 210, which can have similar functionality to a delay locked loop (DLL), allows a more accurate choice of sampling point for ADC 207, leading to improved performance. Further, small steps in phase block 210 allow for a high bandwidth timing recovery loop in some embodiments. This higher bandwidth recovery loop can allow for more jitter to be tracked, which again can be associated with a more robust implementation.

Further, a partition between analog and digital domains as illustrated in FIG. 2A (and in FIGS. 3A-3D) allows some embodiments of the present invention to be implemented with more complicated algorithms in the digital domain, which are normally unavailable in an analog approach. These digital algorithms can control both the analog and digital stages, as required.

Additionally, in some embodiments of receiver 100 the digital loops implemented in control block 208, such as, for example, offset and baseline wander loop 220, analog equalizer loop 218, gain stage loop 216, and timing recovery loop 214, can be continuously adaptive, again leading to more robust performance. Adaptive digital loops can readily track changes in the environment, such as those due to temperature changes or to human interaction. In some embodiments of the invention, the digital loops can be frozen once they reach an optimum position.

Figure 3A:
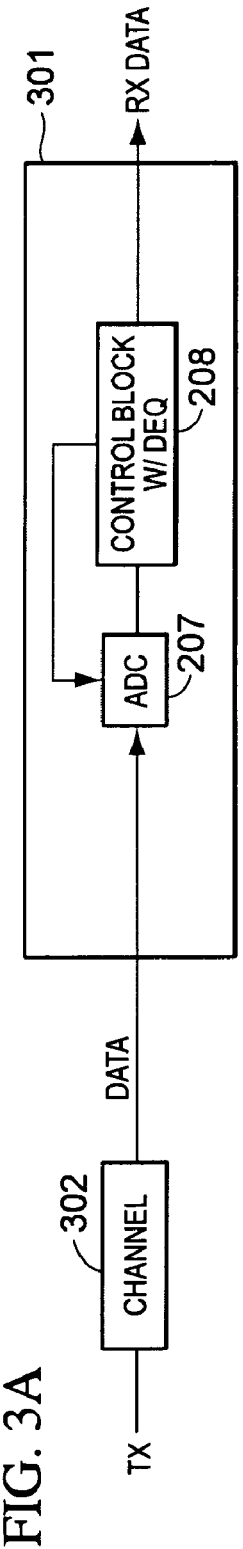
FIGS. 3A, 3B, 3C, and 3D illustrate equalization in embodiments of receiver according to the present invention.
Figure 3B:
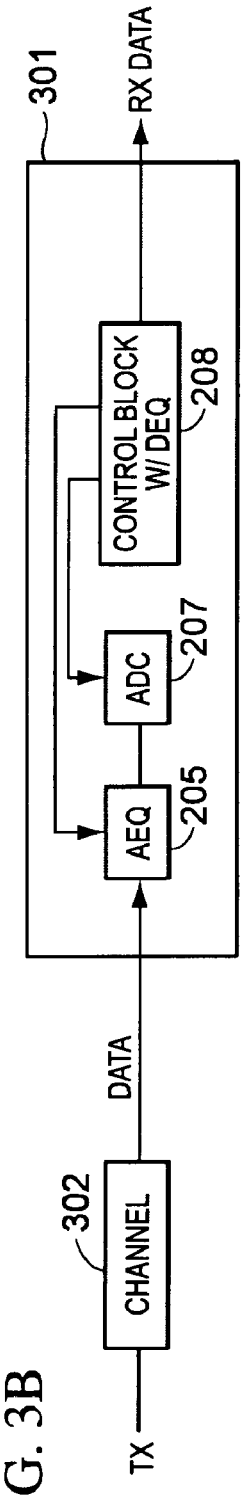

FIGS. 3A, 3B, 3C, and 3D illustrate example embodiments of equalization according to the present invention. FIG. 3A illustrates an embodiment of the present invention where the equalization is accomplished entirely by digital equalizer 212 of control block 208 in the digital domain. FIG. 3B illustrates an embodiment of the present invention where the equalization is split between the analog and the digital domains. FIG.

3C illustrates an embodiment where the equalization is split between an analog equalizer and a decision feed-back equalizer (DFE), however the DFE correction term is utilized in the analog domain. FIG. 3D illustrates an embodiment where the equalization is accomplished entirely in the analog domain and control block 208 does not include digital equalizer 212.

As shown in FIGS. 3A, 3B, 3C, and 3D, a transmit signal is transmitted through a channel 302. The transmission medium of channel 302 typically behaves like a low-pass filter, suppressing higher frequency components of the transmitted signal and causing phase distortion. The resulting dispersion of the transmitted signal results in inter-symbol interference (ISI). Also, with the ISI problem, the "eye" of the receiver will shrink and, in extreme cases, can close completely. The process of equalization attempts to counter the effects of ISI, opening the eye of the received signal, to aid in error free detection.

FIG. 3A illustrates a complete digital implementation of equalization 301. The digitized signal from ADC 207 is input to control block 208, which includes a digital equalizer 212 (see FIG. 2B). Digital equalizer 212 of control block 208 can be a linear or decision feed-back equalizer with multiple taps, each of which can be an independently adapting tap. A completely digital implementation for the equalizer can result in more consistent equalizer characteristics and better immunity to process variations in manufacturing a chip than is achievable with an analog approach. Further, such an equalizer can be capable of adapting to a least mean-square error (LMSE) solution for any channel that is within the range of digital equalizer 212, thereby providing equalization for a broad range of channels. Even channels 302 with unusual characteristics, which may occur in channels 302 that have been damaged slightly or that are exhibiting strange reflections. However, implementing a complete digital equalization such as that illustrated in FIG. 3A requires that ADC 207 provide more resolution (i.e., representing the digitization with more bits) than would otherwise be necessary. The need for ADC 207 to provide more bits per sample increases the power and area cost of the analog-to-digital converters of receiver 120.

FIG. 3B illustrates an embodiment of equalization 301 where the equalization is shared between the analog domain and the digital domain. As such, the data signal is partially equalized in analog equalizer (AEQ) 205 before the signal is digitized in ADC 207. The digital signal from ADC 207 is then input to control block 208, which includes digital equalizer 212. As shown in FIG. 3B, AEQ 205 can be controlled digitally by control block 208, for example by analog equalizer loop 218. In some embodiments as shown in FIG. 3B, gross equalization can be performed in the analog domain by analog equalizer 205 while the remaining equalization is accomplished in the digital domain by digital equalizer 212 of control block 208. Splitting the complexity of the equalization task between the digital and analog domains requires the ADC 207 to provide fewer bits than is required if the equalization is accomplished completely in the digital domain. Therefore, ADC 207 need not be as expensive to manufacture and may not require as much of a power and area budget as that required if the equalization is performed entirely in the digital domain. Additionally, many of the advantages of performing the equalization in the digital domain can be preserved. These advantages include the ability to adapt to the LMSE solutions as well as providing well-defined performance characteristics and greater immunity to process variations. Additionally, in some embodiments the analog equalization section, AEQ 205, can be frozen and the adaptation of the digital equalization performed by digital equalizer 212, which in general can be more precisely controlled, can be utilized. The main disadvantage of providing digital equalization is that it still requires that ADC 207 provide more bits than would be required if equalization is performed purely in the analog domain. Further, both the analog equalization and the digital equalization, each of which cost area and power on the circuit, need to be implemented.

Digital equalizer 212 can be implemented in control block 208 in FIG. 3B can be a digital linear equalizer or a decision feedback equalizer (DFE). With gross equalization being accomplished in the analog domain by AEQ 205, the fine equalization can be accomplished by digital equalizer 212, providing the advantage of reliability and reproducibility of the digital circuit. Further, in some embodiments AEQ 205 can utilize coarser analog components, saving both chip area and power, and the receiver is not limited to equalizing a set of channels of fixed shapes. The multi-tap digital linear equalizer 212 can be adaptively adjusted to fit to the peculiarities of the actual channel. Therefore, providing a digital linear equalizer or a decision feedback equalizer as digital equalizer 212 along with AEQ 205 can provide optimal equalization, but again at the cost of greater power consumption and larger die area due to the increased complexity of ADC 208 and equalizer 212 of control block 208.

A decision feedback equalizer (DFE) implemented in equalizer 212 of control block 208 can offer excellent performance with high noise immunity. However, in a DFE a single decision error can result in multiple errors from the receiver. In embodiments where AEQ 205 does most of the equalization, this error propagation effect is small. Further, the implementation of a DFE is difficult because of the need for the present decision to be fed back into equalizer 212 for use in making the next decision. Further, with equalizer 212, ADC 207 will need to produce a greater number of bits (i.e., higher resolution digitization) than would be required with purely an analog approach to equalization. In some embodiments where equalizer 212 includes a DFE, the digital control loop implemented in control block 208 can adapt AEQ 205 such that the first tap of the DFE is not needed to minimize the difficulty in implementing the critical path of the DFE.

Utilization of either a linear equalizer or a decision feedback equalizer in equalizer 212 of control block 208 offers distinct advantages over a purely analog equalization approach. Analog equalizer 205 can perform gross equalization and digital equalizer 212 can provide the more flexible fine equalization to fully counter the distortions that occur in channel 302. During acquisition AEQ 205 can help to ensure that the decision ultimately made in slicer 209 has a high likelihood of being correct, allowing reliable adaptation of the feedback coefficient. Also, the presence of analog equalization will help to ensure that the feedback coefficient is small, minimizing the effect of error propagation. The analog equalization, coupled with a decision feedback equalizer implementation of equalizer 212, can provide a more reliable system, albeit a more expensive system, than performing all of the equalization in the analog domain. The added expense is primarily due to the increased number of bits that ADC 207 produces to allow performance of digital equalization, however the implementation of a DFE or linear equalizer in digital equalizer 212 also adds to the size and power of the die.

In some embodiments, as shown in FIG. 2B, a deserializer 222 can be implemented in control block 208, between ADC 207 and digital equalizer 212, if present. Such an implementation is inconsistent with utilization of a DFE within digital equalizer 212. For example, the ADC data from ADC 205 can be parallelized by a factor of four to help make the digital implementation of the digital control in the feedback loops of control block 208 simpler, however then data is not present to be utilized in a DFE.

Figure 3C:
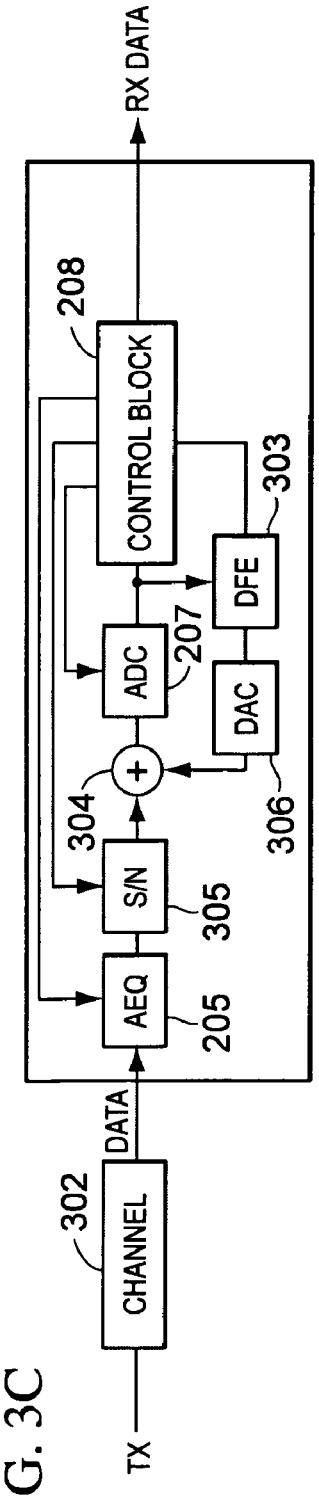
Figure 3D:
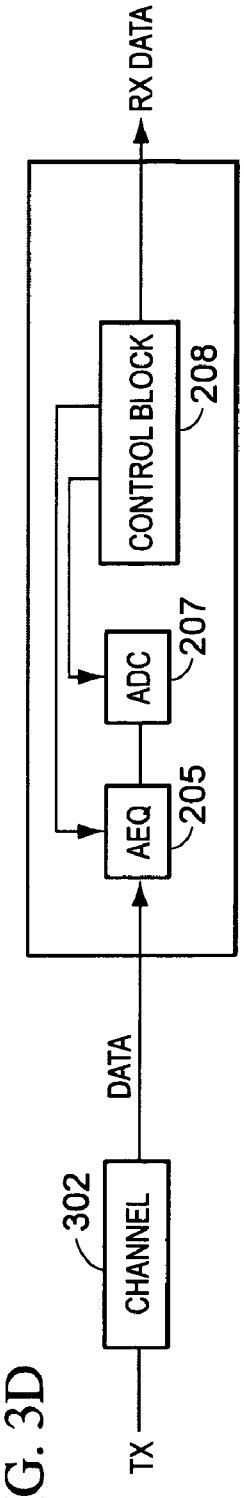

FIG. 3C illustrates an embodiment of equalization that includes an analog equalizer 205 and a DFE 303, where DFE 303, instead of being implemented entirely in digital equalizer 212, does the correction in the analog domain. The control loops for AEQ 205 and DFE 303 are implemented in control block 208, but no further equalization is performed in control block 208. DFE 303 receives the output signal from ADC 207, which not also acts as slicer 209, to calculate the feedback. The digital feedback value is input to a digital-to-analog converter (DAC) 306. The analog output signal from DAC 306 is then added to the input signal to ADC 207 in adder 304. A sample-and-hold (S/H) block 305 samples the signal from AEQ 205 and the output signal from DAC 306 is added to the held signal in adder 304. In that fashion, the uncancelled ISI is summed out of the analog signal after sample-and-hold 305, but before the slicer part of ADC 207. The advantage of this technique is that AEQ 205 can be combined with a DFE 303 (with no feed forward taps) while retaining the ability to utilize a simple ADC 207. The disadvantage is that there is a difficult critical path as the slicer of ADC 207, DFE calculation performed in DFE 303, and DAC 306 needs to execute in one clock period.

In some embodiments, AEQ 205 is updated according to the loop equation $$EQ_k=EQ_{k-1}+d_{k-1}e_k{}^*\alpha_{EQ},$$

which is executed by analog equalizer loop 218 of control block 208. In this equation, $EQ_k$ is the equalizer setting at time k, $e_k$ is the error at time k, $d_{k-1}$ is the decision at time k−1, and $\alpha_{EQ}$ is the equalizer loop coefficient. This loop equation ensures that the first tap of DFE 303 will not be utilized, which increases the time available to implement the critical path to two clock cycles. In some embodiments, other analog equalizer loop equations may be implemented in loop block 218 that may have better performance when combined with DFE 303, but may not ensure the first tap of DFE 303 is not needed, hence are more difficult to implement. An example of such a loop equation is $$EQ_k=EQ_{k-1}-d_k{}^*e_{k-1}{}^*\alpha_{EQ}.$$

FIG. 3D illustrates an embodiment of equalization where the equalization is performed completely in the analog domain. As shown, the control loop for AEQ 205 is performed in analog equalizer loop 218 of control block 208, but no further equalization is performed in control block 208 (i.e., control block 208 does not include digital equalizer 212). As discussed above, the advantage of performing the equalization entirely in the analog domain is that the complexity of ADC 207 is reduced. Although AEQ 205 is not as flexible as a digital equalizer would be, AEQ 205 is more flexible than a purely analog equalizer because it takes input from digital control loop 218 in control block 208. Implementing digital control loops allows for determination of the optimum setting for each stage of equalizer 205, allowing for precise control of AEQ 205 for cleaner equalization and better performance.

Figure 4A:
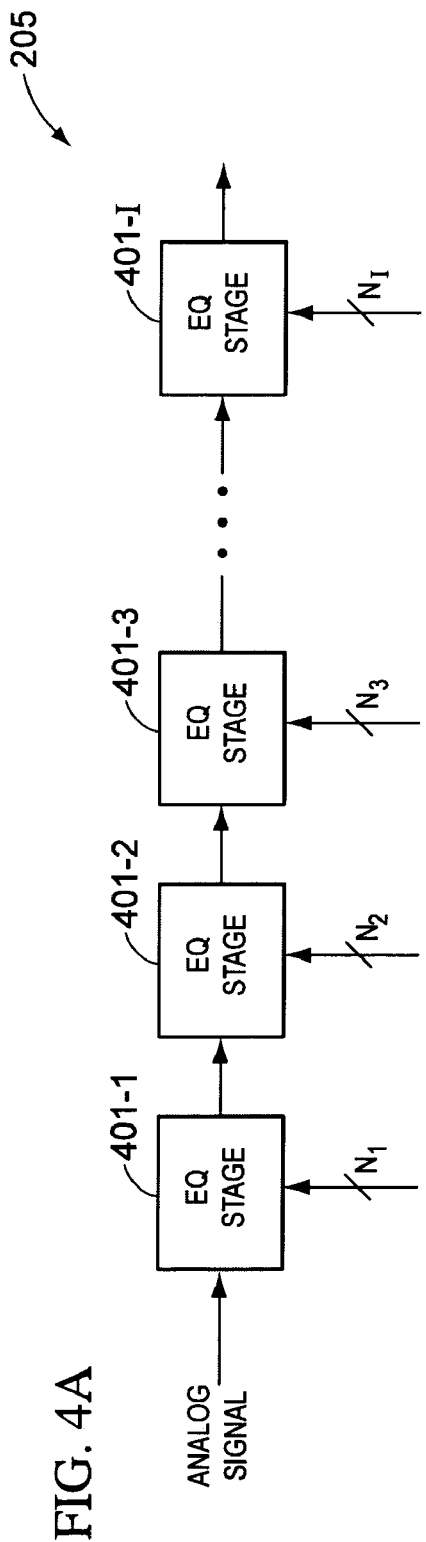
FIGS. 4A, 4B, 4C, and 4D illustrate analog equalization according to some embodiments of the present invention.
Figure 4B:
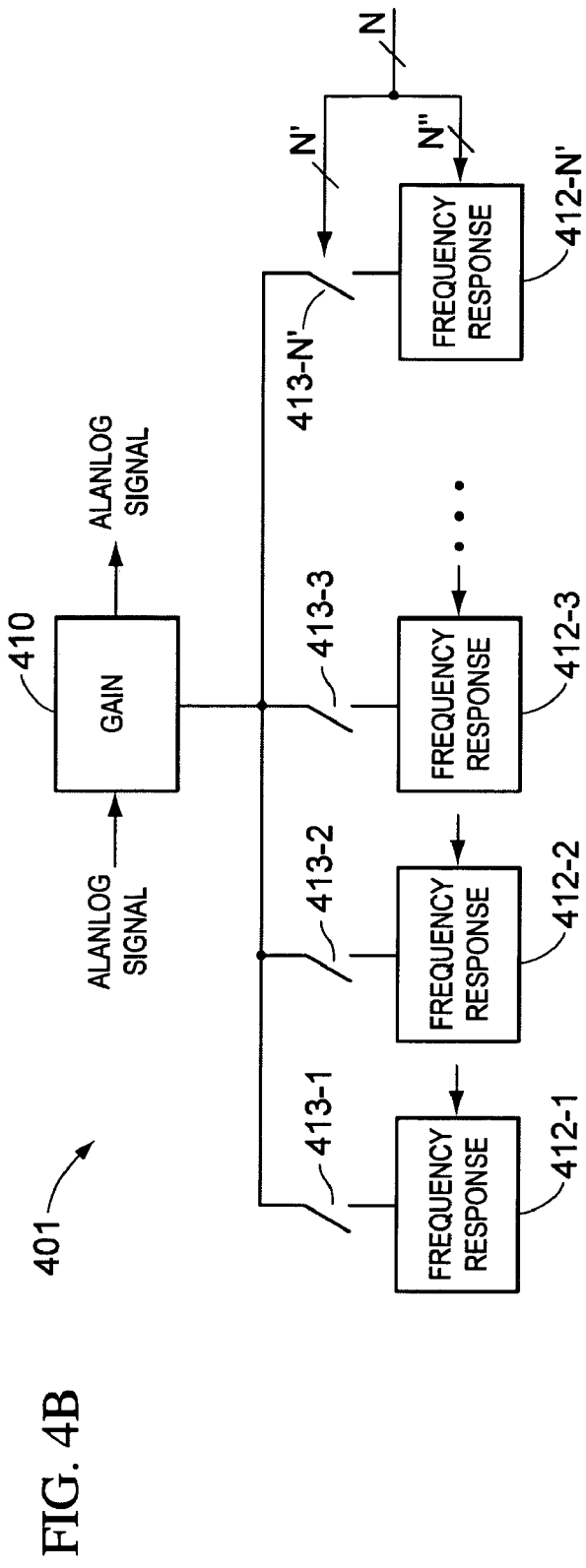
Figure 4C:
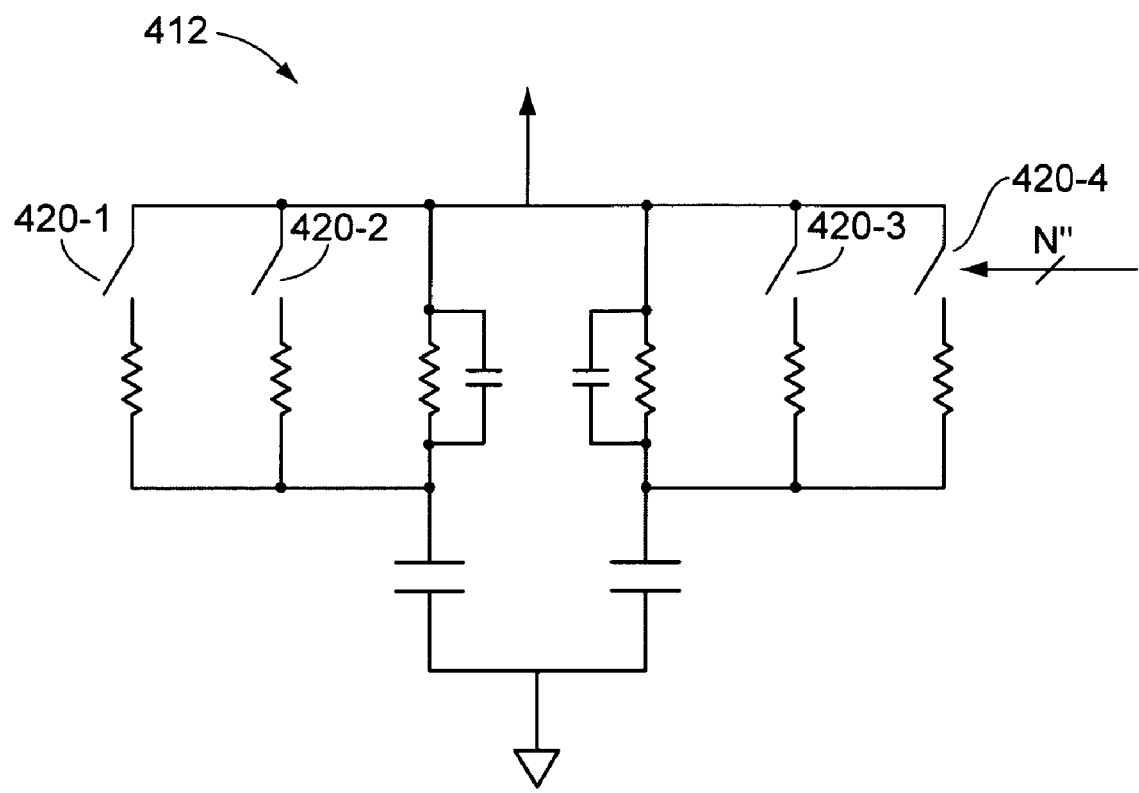

In some embodiments, AEQ 205 can be a multi-stage equalizer. For example, a four-stage equalizer can be implemented where each stage is controlled digitally. In some embodiments, each stage of the multi-stage equalizer includes multiple options. FIGS. 4A, 4B, and 4C illustrate some embodiments of AEQ 205 according to the present invention.

As shown in FIG. 4A, AEQ 205 can include any number I of equalizer stages 401-1 through 401-I. In the embodiments illustrated in FIG. 4A, equalizer stages 401-1 through 401-I are coupled in series. Each of equalizer stages 401-1 through 401-I can be digitally controlled from digital control block 208. In some embodiments, not all of equalizer stages 401-1 through 401-I are digitally controlled. In some embodiments, the gain of each stage can have a different shape in the frequency domain in order to maximize the flexibility of AEQ 205.

FIG. 4B illustrates an embodiment of equalizer stage 401, which is an arbitrary one of equalizer stages 401-1 through 401-I. As shown in FIG. 4B, the analog signal is received in a gain block 410. The frequency response of gain block 410 is controlled by one or more frequency response blocks 412-1 through 412-N'. Each of frequency response blocks 412-1 through 412-N' can be coupled to gain block 410 through a corresponding one of digitally controlled switches 413-1 through 413-N'. Further, in FIG. 4B, some or all of frequency response blocks 412-1 through 412-N' can be digitally controlled.

FIG. 4C illustrates an example of a frequency response block 412 according to some embodiments of the present invention. As shown in FIG. 4C, frequency response block 412 can include switches 420-1 through 420-4 that allow the resistance to change, allowing the frequency response of gain 410 to be controlled. Although four switches 420 are shown in FIG. 4C, any number of switches N" can be utilized.

As an example of this implementation, some embodiments of AEQ 205 can include four stages 401 (stages 401-1 through 401-4). Each stage can include eight frequency response options 413 (frequency responses 413-1 through 413-8), with each frequency response 413 including four switchable resistors controlled by switches 420-1 through 420-4. Such an arrangement can provide equalization of a channel with up to 40 dB loss at 825 MHz. This large amount of equalization allows receiver 100 to operate over extended lengths of medium and in harsher environments than can receivers that cannot perform this amount of equalization. Providing a larger amount of equalization allows the use of less expensive components in signal transmission hardware, which can translate to cost savings in boards, connectors, traces, and electrostatic discharge (ESD) protection devices such as capacitors. The ability to perform up to 40 dB of equalization also allows the freedom to use longer reach medium and be less concerned about where receiver 100 and connectors should be placed within a working system. In other words, receiver 100 can service input signals from disparate parts of a system that may, in some cases, have to traverse large distances over low quality copper trace.

An algorithm that may be executed by digital control 208 to adapt the operation of AEQ 205 may be implemented in analog equalization loop 218 by an equalization equation as follows:

$$EQ_k=EQ_{k-1}+d_{k-1}e_k{}^*\alpha_{EQ}$$

where $EQ_k$ is the equalizer setting at time k, $e_k$ is the error at time k, $d_{k-1}$ is the decision at time k−1, and $\alpha_{EQ}$ is the loop coefficient. As shown in FIG. 2, digital control 208 receives the decision from slicer 209 and calculates the error $e_k$, which is the difference between the input signal to slicer 209 and the decided upon signal. The loop coefficient $\alpha_{EQ}$ controls the gain of control loop 218. This phase detector $(d_{k-1}{}^*e_k)$ indicates if the input signal to AEQ 205 is being over or under equalized. This accumulated phase detector output is processed through a mapping function implemented in analog equalizer loop 218 of digital control 208 to determine the optimum settings for each of stages 401 of AEQ 205. In some embodiments, a thermometer code can be utilized. In some embodiments, any mapping is allowed as long as the amount of equalization increases, in some embodiments monotonically, with $EQ_k$.

In some embodiments, the phase detector indicated in the above equation can be updated only on symbol transitions, which can provide a stronger indication of over or under equalization. In some embodiments, sub-sampling of the input by a factor, for example of four, helps reduce power dissipation in the analog domain because it allows the corresponding deserializers to be shut off. Additionally, the gain of the loop represented by the above equation can be controlled, controlling the bandwidth at which digital control 208 responds to fluctuations in the channel.

In some embodiments, the thermometer code utilized in the mapping can be 28 bits wide, providing for seven bits of control for each of the four stages 401 of the equalizer. Each stage 401, then, can have eight individual settings. As more and more equalization is needed, stage 401-1 will go from 0 to 7, while the other stages stay at 0. After stage 401-1 has reached its maximum value, stage 401-2 begins to increase to 7. The remaining stages are implemented similarly in turn.

Figure 4D:
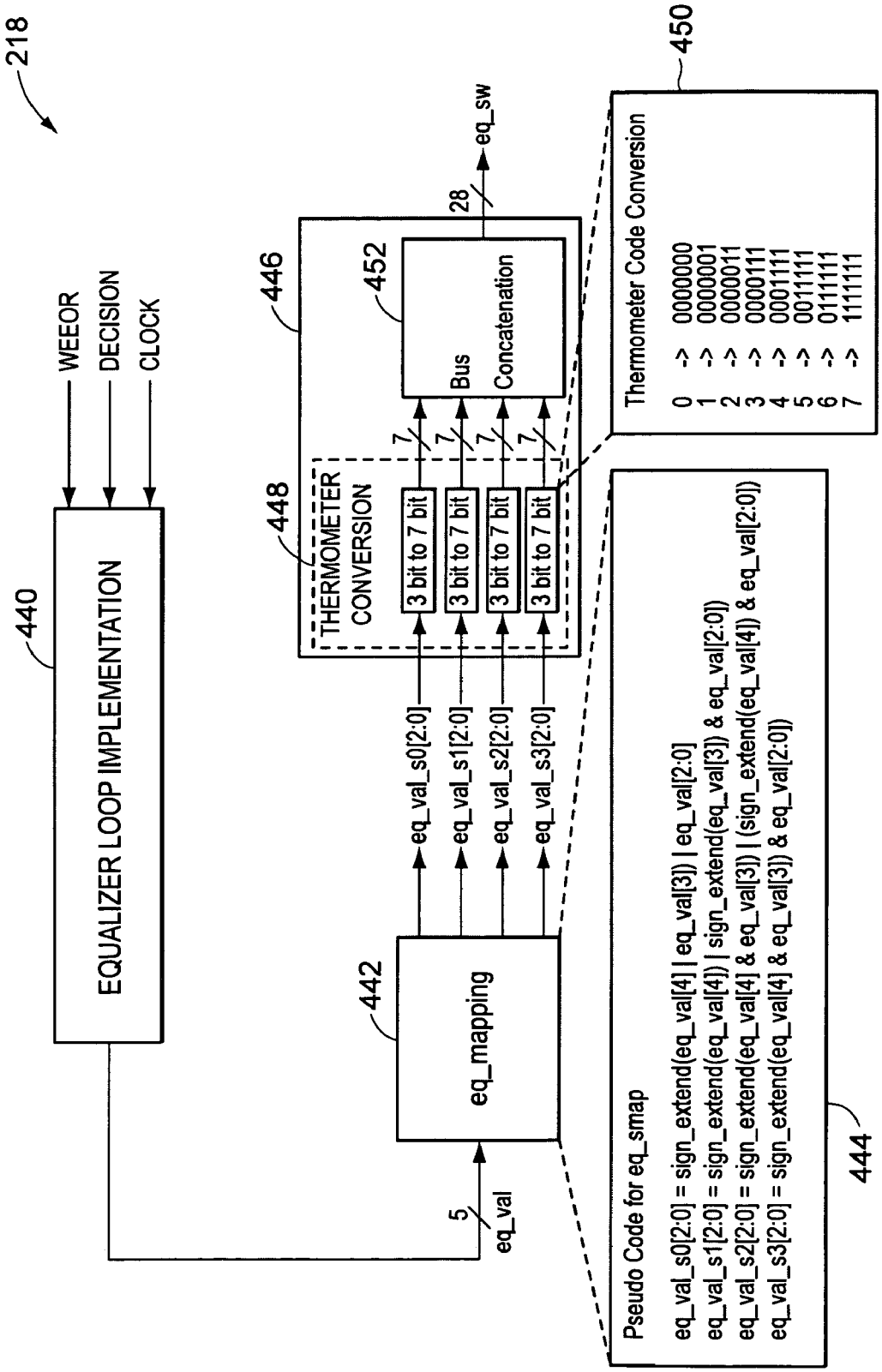

FIG. 4D illustrates an example embodiment of analog equalizer loop 218 that can be implemented with the embodiment of AEQ 205 shown in FIGS. 4A through 4C. As shown in FIG. 4D, equalizer loop 218 receives decision and error data and a clock signal into loop equation block 440, which implements a loop equation such as that shown above. The output signal from equalizer loop block 440, which in some embodiments is a 5-bit value, is input to equalizer mapping 442. An example code for implementing a mapping is shown in pseudo-code block 444. As shown, equalizer mapping 442 outputs multiple values, in this case four values of three bits to control each of the four stages 401. Each of these are input to a thermometer conversion 448 in conversion block 446. An example thermometer code conversion is shown in block 450. In this particular example, each of the 3-bit values is converted to a 7-bit thermometer code. The output signals from each of thermometer code conversions 450 is then input to bus concatenation 452 to be transmitted to AEQ 205 as a 28-bit parallel signal. As discussed above, any number of stages 401 can be utilized along with conversion to any number of bits to control each stage. As a result, conversion block 446 can output any number of bits.

As is further shown in FIG. 2A, some embodiments of receiver 100 can include gain stage 206, which can also be digitally controlled by gain stage loop 216 in control block 208. Gain stage 206 can provide reliable data decoding of the received signal over a range of expected amplitudes. Disparity in the signal amplitude received at the receiver can have a number of different sources, including differences in the transmit strengths of various transmitters, cable imperfections, or imprecise equalization.

As shown in FIG. 2A, gain stage 206 can be an analog gain stage. However, in some embodiments a separate gain stage can be implemented digitally in control block 208. In some embodiments, gain stage 206 can be an analog gain stage and there is an additional gain stage implemented digitally in control block 208. In some embodiments, analog gain stage 206 can be implemented as a level shifter, such that the slicers implemented in ADC 207 are shifted based on the control values generated in gain stage loop 216 of control block 208. This implementation removes the need for a multiplier or amplifier implemented in the analog datapath. In some embodiments, gain stage 206 can include a variable gain amplifier that is digitally controlled.

Figure 5:
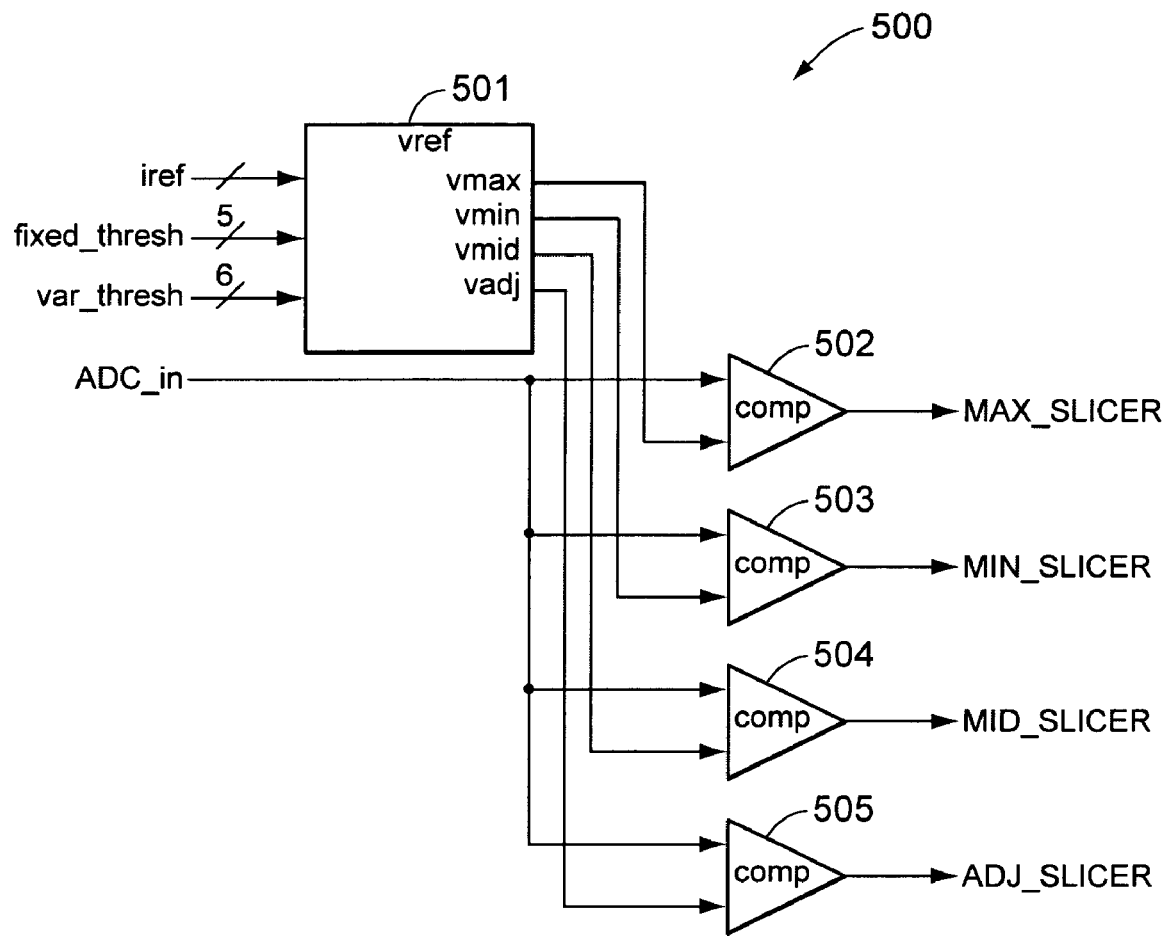
FIG. 5 illustrates an analog-to-digital slicer that can be utilized without a gain stage according to some embodiments of the present invention.

A slicer arrangement 500 for ADC 207 according to some embodiments of the present invention which do not do digital equalization is illustrated in FIG. 5. As shown in FIG. 5, a voltage reference block 501 provides comparison voltages to comparators 502, 503, 504, and 505. An input to comparators 502, 503, 504, and 505 is coupled to AEQ 205 to receive the output signal from AEQ 205. As shown in FIG. 5, comparator 502 is coupled to voltage reference block 501 to receive a Vmax voltage and outputs a MAX_SLICER signal; comparator 503 is coupled to voltage reference block 501 to receive a Vmin voltage and outputs a MIN_SLICER signal; comparator 504 is coupled to voltage reference block 501 to receive a Vmid voltage and outputs a MID_SLICER signal; and comparator 505 is coupled to voltage reference block 501 to receive a Vadj voltage and outputs an ADJ_SLICER signal. As shown in FIG. 5, each of comparators 502, 503, 504, and 505 provide a +1 if the equalizer output signal eq_out is higher than the respective reference signal and −1 if the equalizer output signal eq_out is lower than the respective reference signal. Although digitization to just over 2 bits is illustrated in FIG. 5, a high resolution digitizer can be implemented.

In the exemplary embodiment shown in FIG. 5, slicer arrangement 500 includes three main slicers on input signal eq_out, represented by comparators 502, 503, and 504. Comparator 504, which outputs the MID_SLICER signal, attempts to slice the signal eq_out at the average signal value, nominally 0 Volts, to determine if the signal is a digital +1 or a digital −1 (logical 1 or 0). In these embodiments, slicer 209 is actually part of ADC 207, providing a decision and error to digital control 208.

Comparator 502, which determines whether the signal is greater or less than a threshold that would indicate an ideal +1, compares the eq_out signal with the Vmax signal. The Vmax signal is set at a voltage level that indicates an ideal +1. Similarly, comparator 503 outputs the MIN_SLICER signal, which indicates whether or not the signal eq_out is greater than or less than an ideal voltage level for indication of a −1. The combined set of signals MID_SLICER, MAX_SLICER, and MIN_SLICER allows the digital logic of ADC 207 to determine the symbol associated with the signal eq_out and the sign of the error in determining the symbol.

In some embodiments, the value Vmid is not affected by the gain stage loop. In some embodiments, only the values of Vmax and Vmin are adjusted. Gain stage loop 216 of digital control 208 can utilize the error and decision information received by MIN_SLICER and MAX_SLICER in the expression $$agc_k = agc_{(k-1)} + (e_k * d_k) * \alpha_{AGC}$$

where $agc_k$ is the automatic gain setting at time k, $e_k$ is the error at time k, and $d_k$ is the decision at time k. Again, the decision at time k is based on the output of the slicer of ADC 207 and the error at time k is related to the difference between the input signal to slicer 500 and the decision by slicer 500. More precisely, $d_k$ is the output value of MID_SLICER 504 and $e_k$ is the output value of MAX_SLICER 502 if $d_k=1$ and is the output value of MIN_SLICER 503 if $d_k=-1$. The value $\alpha_{AGC}$ controls the gain of the control loop implemented in gain stage loop 216. As indicated by the above equation, the phase detector at time k ($agc_k$) is the result of multiplying the error at time k with the decision at the same time k. The phase detector output is accumulated in a feedback loop and utilized to determine the optimum gain setting, which determines the slicer positions of slicer arrangement 500 in ADC 207.

In the exemplary embodiment of slicer arrangement 500 shown in FIG. 5, the five most significant bits of the accumulator ($agc_k$) are utilized to determine the values of both Vmax and Vmin. Therefore, each of comparators 502 and 503 can compare with a choice of 32 different voltages. The minimum slicer and the maximum slicer (comparators 502 and 503 along with voltage levels Vmax and Vmin) slice the negative and positive sides of the received signal, respectively. Therefore, the 5-bit unsigned value supplied to voltage reference 501 by digital control 208 should be carefully utilized. In one example, the 5-bit number can be a ones complement number with each count representing 25 mV.

In some embodiments, digital control 208 can adaptively adjust the value of $agc_k$ continuously, or can freeze the value of $agc_k$ after some amount of settling time. Further, there is some gain control options that can be implemented that determine how quickly $agc_k$ will converge and respond to changes in the input signal to receiver 100. Another option is to subsample the input signal, for example by a factor of four, to help reduce power dissipated in the analog circuitry as it allows the corresponding deserializers in deserializer 222 to be powered down. Subsampling can be performed in deserializer 222.

In some embodiments, gain stage 207 can include a programmable gain amplifier (PGA) that adjusts the amplitude of the incoming signal from AEQ 205 so that the signal is presented to the slicers of ADC 207 at the desired levels. This adjusts the signal to the slicers as opposed to adjusting the slicers to the signal, as a result the phase detector value $e_k * d_k$ in the above loop equation is negated when implemented in gain stage loop 216. In some embodiments, a digital gain stage (not shown) can be implemented in control block 208. In this fashion, signals can be adjusted to slicer 209 so that appropriate symbol decisions can be made. In any system where there is digital gain, ADC 207 utilizes more bits than is shown in the embodiment of slicer structure 500 shown in FIG. 5. In some embodiments, a combination of analog and digital gains can be made. Gain stage 206 can be implemented to make maximum use of the dynamic range of ADC 207 while a digital gain element in control block 208 can be implemented to ensure that the signal hits the slicers of slicer 209 at the desired levels.

As shown in FIG. 5, comparator 505 compares the input to ADC 207 with a voltage Vadj to produce a signal ADJ_SLICER. Comparator 505 and the value of Vadj can be utilized for status monitoring of receiver 100. When acquiring a modem to an incoming signal, where the modem is executing adaptation loops to find the optimum operating points, it is often important to know that the receiver has reached a good state so that reliable decoding occurs. Moreover, in the real world, events occur such that a once locked system (i.e., one that has found an optimum adaptation) will on occasion become unlocked; perhaps because the medium itself was disturbed or due to a large noise source, vibrations in the environment, or simply unplugging of the transmitting device.

In some embodiments, monitoring of the status of the adaptation can be performed with comparator 505. Other slicers can be implemented as well, but more slicers will utilize more area and power on the chip. In the exemplary embodiment shown in FIG. 5, Vadj is adjusted to take positions between Vmin and Vmax. The results from comparator 505 can be utilized to determine how many samples fall beyond a region that is near the slicer levels that determine whether a signal is a logical 1 or logical 0 (Vmid). In control block 208, a count of bad samples can be recorded and if too many are detected in a programmable period of time, the link can be flagged or deemed bad. Vadj can be utilized to check both the positive region and the negative region for bad symbols. Logic in control block 208 controls which region to check and for how long that region should be checked. The checking process is then repeated.

Figure 6B:
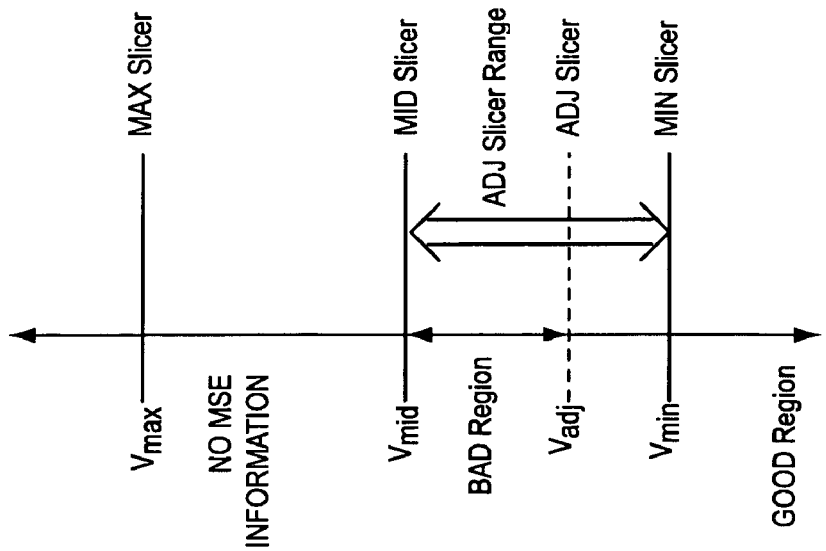
FIGS. 6A and 6B illustrate a data checking process that is implemented in the analog-to-digital slicer illustrated in FIG. 5.
Figure 6A:
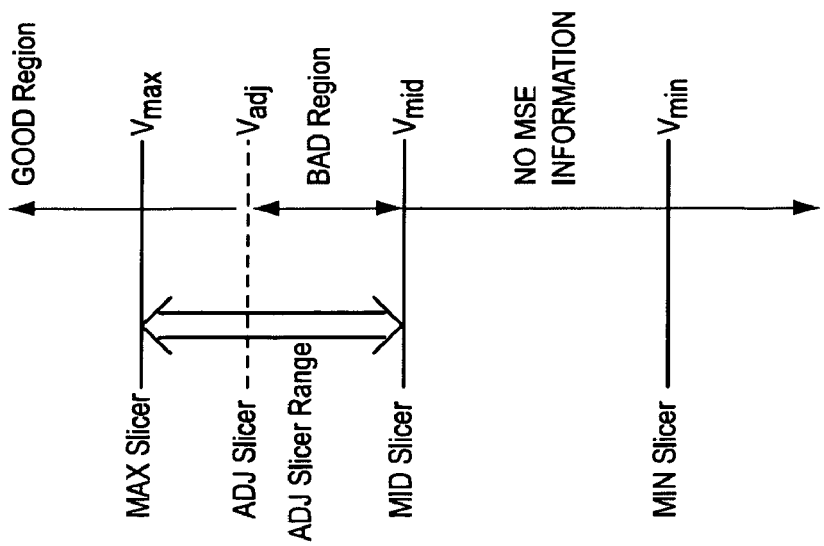

This checking process is illustrated in FIGS. 6A and 6B. As shown in FIG. 6A, Vadj can be set between Vmid and Vmax and signals that are detected below Vadj but above Vmid can be deemed "bad." As shown in FIG. 6B, Vadj can be set between Vmin and Vmid and signals above Vadj but below Vmid can be deemed "bad." In some embodiments, Vadj is a function of Vmin/Vmax to ensure an accurate monitoring of the status.

Figure 6C:
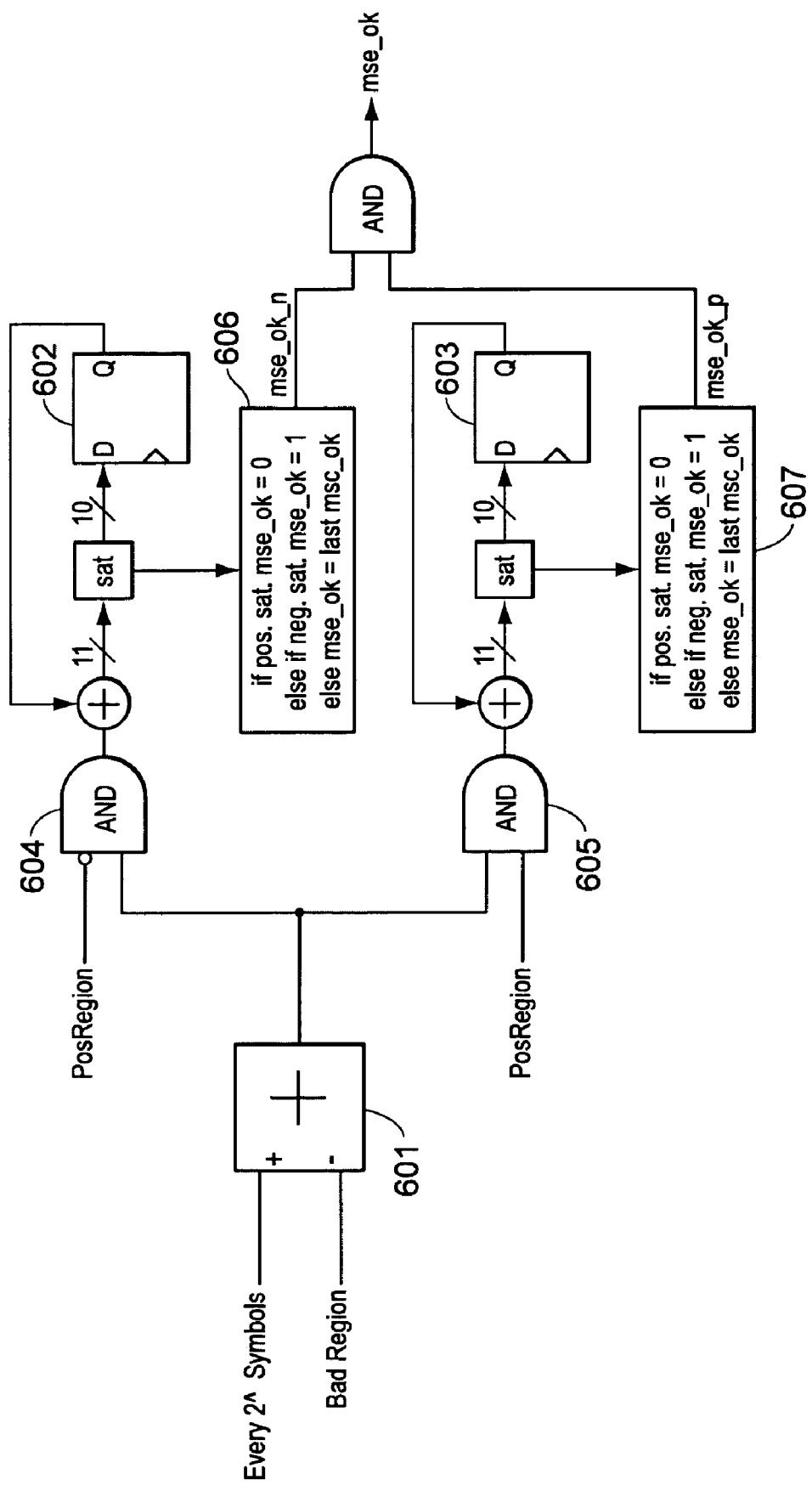
FIG. 6C illustrates a digital block that executes the data checking process illustrated in FIGS. 6A and 6B.

FIG. 6C shows how symbols that are determined to be in the bad region are utilized. Phase detector 601 subtracts one if the symbol lies in the bad region and adds one every $2^x$ clocks, where x can be any integer, for example 8. Based on whether Vadj is in the PosRegion (in FIG. 6A), the output signal from phase detector 601 is selectively input to one of the two accumulators, either accumulator 602 or accumulator 603. Access to accumulators 602 and 603 is determined by AND gates 604 and 605, respectively. If the accumulator saturates positively or negatively, as determined by test block 606 and 607, mse_ok_n or p changes to a 1 or a 0, otherwise it remains where it is. Only if both these mse_ok signals, mse_ok_n and mse_ok_p, are high, is the final signal, mse_ok high, which represents the status being good. The PosRegion bit determines whether Vadj is above Vmid, as in FIG. 6A or below as in FIG. 6B, and controls which accumulator is used and can toggle every $2^y$ clocks, where y is usually much greater than x, for example y=x+8.

In some embodiments, the threshold value of Vadj that is utilized to determine whether or not a symbol is "bad" can be a programmable fixed ratio of the magnitudes of Vmin and Vmax. As shown in FIG. 5, the variable threshold var_thresh is input to voltage reference 501. The value var_thresh can be a 6-bit word where the most significant bit determines the region (positive or negative) to be tested and the five least significant bits control where in that region Vadj is set. It is the ratio of Vadj to Vmax and Vmin and fixed_thresh (also referred to as $AGC_k$) (from FIG. 5) that determine the least significant bits of Vadj.

In some embodiments, status monitoring can be performed with multiple slicers set to check values between Vmin and Vmax. For example, an additional comparator can be added to slicer arrangement 500 so that the negative region (that between Vmin and Vmid) and the positive region (that between Vmid and Vmax) can be monitored simultaneously. Utilizing slicers that monitor voltages beyond the positions of Vmin and Vmax would be useful to check for signals that have too many samples that are too large, reducing the risk that a false assertion of bad data is made. Additional slicers can be added at the cost of additional circuitry, greater power consumption, and increased die area.

As is further illustrated in FIG. 2A, a DC offset (DCO) and base-line wander (BLW) circuit can also be implemented in the analog domain and controlled digitally by control block 208. DC offset typically occurs due to imperfections in the transmit and/or receive analog circuitry. The DC offset can be a simple DC bias, for example, if the transmission of logic 1's had slightly more power than the transmission of logic 0's in a symmetrical binary system (e.g., where logic 1's are transmitted at +V and logic 0's are transmitted at −V). Another phenomenon known as base-line wander occurs in systems where there is a null around DC, perhaps due to capacitive coupling or coupling via a transformer. In this case, the signal may droop when long runs of logic 1's or long runs of logic 0's are transmitted, i.e. when there is a bias between the number of transmitted logic 1's and the number of transmitted logic 0's. Typically, the circuitry for correcting for BLW and for DC offset is combined, but in the case of BLW it is important to ensure that the correction circuitry has bandwidth much larger than the bandwidth of the impairment, typically greater than ten times the BLW impairment bandwidth, in order to ensure that BLW can be sufficiently well-tracked. In systems such as a HDMI system, BLW is less of an issue because the standard encoding process ensures that large runs of logic 1's or logic 0's do not occur.

In some embodiments, a DC offset in DCO/BLW 204 can be implemented as a digital-to-analog converter (DAC) that injects a desired amount of offset in the analog data path to compensate for any impairment. Digital control block 208 can implement the control loop $$dc_k = dc_{(k-1)} - e_k * \alpha_{DCO}$$

where $dc_k$ is the DC offset value at time k and $e_k$ is the error at time k. Again, $e_k$ is determined in a comparison between the input signal and the decision symbol of slicer 209. The parameter $\alpha_{DCO}$ controls the bandwidth of the DCO/BLW loop. The error value is accumulated in the feedback loop represented by this equation and utilized to determine the optimum DC offset setting. As before, this loop can be implemented in DC offset and base-line wander loop 220 of digital control 208. In some embodiments, the value of $dc_k$ can be input to a DAC where the output signal from the DAC is summed with the analog input signal to receiver 100. In some embodiments, the DAC of DCO 204 outputs a differential current that is summed into an output resistance of AEQ 205 to produce the offset that counteracts both DC offset of the circuit and base-line wander.

In some embodiments, $dc_k$ is a 6-bit, 2's complement representation providing for both negative and positive offsets. In systems where baseline wander is problematic, higher bandwidth correction of the DC levels can be made. Again, with precoding so that long strings of logic 1's or logic 0's are not transmitted, baseline wander can be neglected.

In some embodiments, DCO/BLW can adjust the slicer levels of ADC 207 instead of adding DC voltage to the input analog signal, and, as a result, the phase detector value (previously $e_k$) is negated in this situation. In that case, as shown in FIG. 5, all of the voltage levels of output from voltage reference 501 (Vmax, Vmin, Vmid and Vadj) are shifted by the same amount in order to adjust the DC levels. In some embodiments, DCO/BLW can be corrected in digital control 208. In these cases, ADC 207 requires more bits of resolution.

In order to sample the incoming data at the optimum moment in time, receiver 100 must recover and synchronize to the incoming data. As shown in FIG. 2A, a sampling clock is inputted to ADC 207 by phase interpolator 210. The sampling time signal determines at what time ADC 207 samples the input analog signal. In some systems, such as an HDMI system, a clock signal is provided on its own channel. The clock frequency can be recovered from the clock channel in order to provide a clean frequency locked clock for receiver 100. The phase can be recovered from the data stream itself. In an HDMI system, for example, the clock signal transmitted on the clock channel is $\frac{1}{10}^{th}$ the baud rate and is frequency locked but not phase locked to the incoming data stream, for example on data channel 122-1.

As shown in FIG. 2A, the clock signal is received in timing circuit 110, which can be a phase-locked loop. The bandwidth of timing circuit 110 determines how much clock jitter may or may not be tracked. In systems such as HDMI, a bandwidth of about 4 MHz can be utilized. The bandwidth effects the absolute amount of data jitter that receiver 100 can tolerate, as defined in the HDMI specification.

In systems such as an HDMI system, which support many transmission rates over a broad range of frequencies (typically about 250 MHz to about 1650 MHz), timing circuit 110 can be a PLL that includes multiple voltage-controlled oscillators (VCOs) to provide a clock signal with the appropriate frequency. In addition to, or possible instead of, having multiple VCOs, timing circuit 110 can also include a divider to provide the appropriate frequency based on the input clock signal. Which of the multiple VCOs or dividers to utilize can be determined in a state machine executed in timing circuit 110 that compares the minimum and maximum frequencies of the chosen VCO and divider combination with the incoming clock signal to determine if the incoming clock signal is within the range of the chosen VCO and divider combination. The state-machine first determines whether the incoming clock signal is within range for the current VCO and divider combination setting. If it is not, then the next VCO and divider combination is selected. The same test can be performed for each VCO and divider combination until the correct VCO and divider combination is determined. Once a suitable VCO and divider combination is determined, the state-machine checks to make sure the recovered clock is within acceptable limits when compared to the incoming clock. The state-machine continues to compare the two clocks to ensure that they remain frequency locked.

In some embodiments, timing circuit 110 can recover the clock frequency information from the data itself, removing the need for a separate clock channel such as is utilized in a HDMI system. Recovering the clock signal frequency from the data stream may result in a cheaper overall system, but can also result in a less robust system because the recovery depends on the system properties including the number of transitions in the transmitted data.

The output signal from timing circuit 110 is input to phase block 210. Each of receivers 120 includes a phase block 210 that matches the phase of the clock signal with the data stream. The process of timing recovery requires the acquisition and synchronization of both frequency and phase. In systems such as an HDMI system, where there are multiple data channels and perhaps a clock channel, even though all of the channels may be frequency locked to each other, the correct phase for each individual channel needs to be determined. Phase block 210, which can be a phase interpolator or a delay locked loop (DLL), picks the correct phase at which to sample the signal input to ADC 207 once timing circuit 110 has been frequency locked. In systems such as an HDMI system each receiver 120 will include a phase block 210 in order to match the phase on the corresponding one of channels 122.

Figure 7:
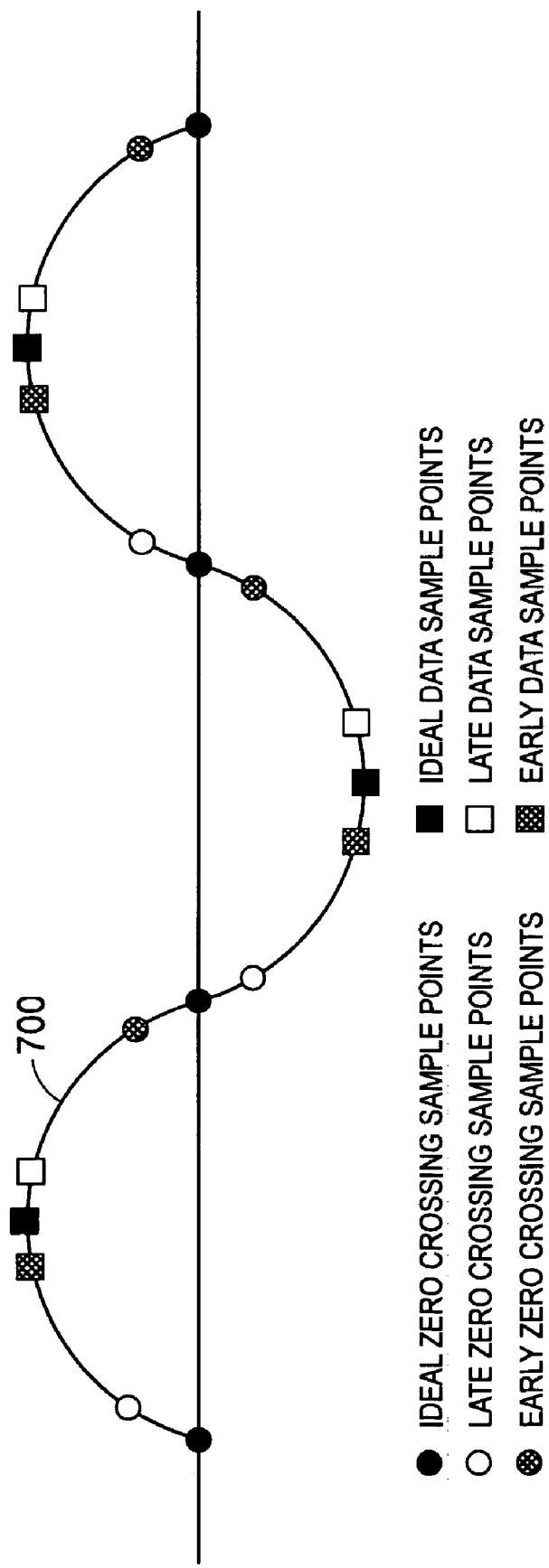
FIG. 7 illustrates correction for timing phase according to some embodiments of the present invention.

FIG. 7 illustrates timing considerations for adapting the phase in phase block 210. In order to adjust the phase, it is important to determine if ADC 207 is sampling data signal 700 too early or too late. There are various ways that can be utilized to accomplish that determination. One way is to look at where zero crossings should have occurred and correlate the zero crossings to the symbols sliced by slicer 209 on either side to determine whether the sampling is too early or too late. Data, then, is sampled at a phase point 180° from the zero-crossing point. Therefore, in order to check the phase, data signal 700 can be sampled at a point 180° from the data sampling and the value sliced there can determine whether data signal 700 is sampled too early or too late. The phase in phase block 210 is then adjusted accordingly. An algorithm that can be utilized for accomplishing this is $$dll_k = dll_{(k-1)} - (z_k * (d_k - d_{(k-1)})) * \alpha_{TRL}$$

where $dll_k$ is the phase position at time k, $d_k$ is the symbol at time k, $d_{(k-1)}$ is the symbol at time k−1, $z_k$ is the zero crossing sample taken at a time half-way between k and k−1, and $\alpha_{TRL}$ is the loop constant for the timing recovery loop. As is shown in FIG. 2B, this loop equation can be implemented in timing recovery loop 214 of digital control 208. In typical implementations, $z_k$ is either +1 or −1 depending on whether the crossing was early or late. The value $z_k$ may have more accuracy to improve the linearity of the phase detector, which would allow for a higher bandwidth, at the expense of utilizing more slicers, which use more die area and require more power. The loop constant $\alpha_{TRL}$ controls the bandwidth of timing recovery loop 214. The value $dll_k$ can then be utilized as the optimum position for phase block 210.

In some embodiments, timing recovery loop 214 of digital control block 208 outputs, for example, a 6-bit word to phase block 210, which chooses one of a number of phases with which to sample the signal input to ADC 207. In some embodiments, 64 phases can be utilized. A separate signal is output to phase block 210 to sample at the zero-crossings. The zero-crossing sample phase is determined from the symbol sample phase by capturing the sampling clock at half a period from the data sampling times. To prevent inaccuracy in the zero-sampling phase, the signal to phase block 210, for example, can also be a 6-bit output. The zero-crossing signal between feedback control block 208 and phase block 210 can be identical to the phase output, unless an offset compensation is being made. In this scenario, the half period offset can be accomplished in the analog domain. Timing recovery loop 214 can be operated at a suitably high gain in order to have the bandwidth to track data jitter.

The precision of the phase generated by phase block 210 and the fact that the steps between phases is small means that jitter in the phase determination is likely not to dramatically affect the operation of the phase control loop. Also, high latency should be avoided because high latency can cause loops to become unstable when trying to use a high bandwidth. In general, loops with high latency tend to add more self noise and do not track as efficiently as loops with low latency, which limits the gain with which the control loop can operate. Reducing the latency and having small precise steps in phase block 210 enables the control loop to operate with a higher bandwidth than would otherwise be possible.

Figure 8:
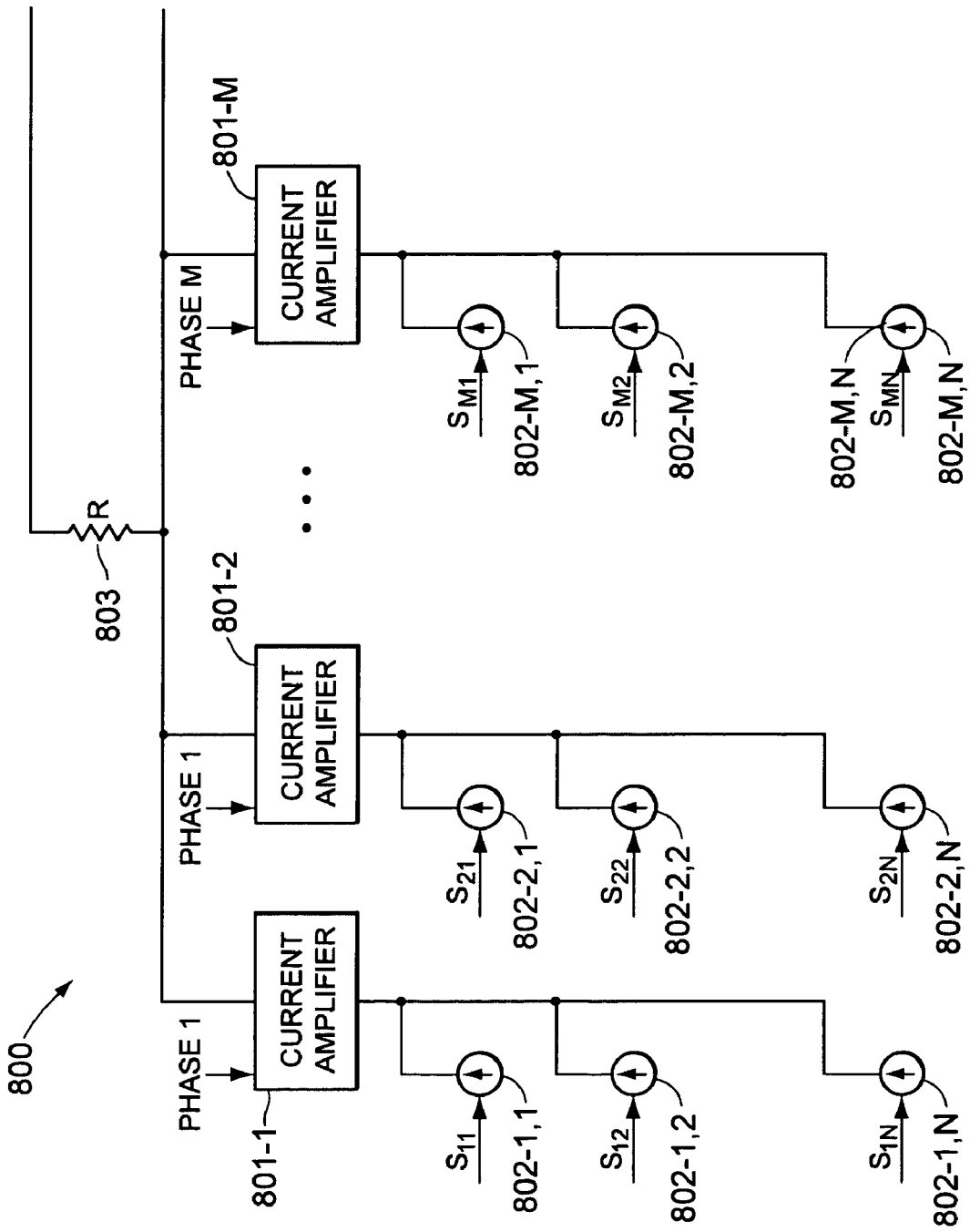
FIG. 8 illustrates a phase interpolator that can be utilized as a phase block according to some embodiments of the present invention.

FIG. 8 illustrates an embodiment of a phase interpolator 800 that can be utilized as phase block 210. As shown in FIG. 8, phase interpolator 800 inputs M phases from timing circuit 110 into M current amplifiers 801-1 through 801-M. Although M can be any number, in some embodiments M can be 8. Each current amplifier 801-1 through 801-M is coupled to N current sources. Current amplifier 801-1, therefore, is coupled to current sources 802-1,1 through 802-1,N. Although N can be any number, in some embodiments N can be 8. Each of current sources 802-1,1 through 802-M,N are switched on or off by a bit $S_{1,1}$ through $S_{M,N}$, respectively. The output signal from each of the N amplifiers are summed together into a current-to-voltage converter 803. By controlling the current using the switchable current sources 802-1,1 through 802-M,N, each amplifier 801-1 through 801-M can be made to contribute a known portion of the signal. Because each amplifier has a different phase of the PLL clock at its input, when the multiple signal currents are summed together the phase is modified.

Alternatively, phase block 210 can be a delay-locked loop, which requires charge pumps and loop filters. DLLs can utilize a lot of chip real estate and can dissipate a lot of power. Typically DLL circuits are limited by the number of phases that can be generated because 1) the routing of the individual phase takes a different path and the selection of the phase causes different delays to occur that can be greater than the phase step size; and 2) the use of a non-ideal phase detector can cause phase jumps between the last and first phase of a cycle. These various errors can add up to produce a non-monotonic phase response (i.e. a command to increase the phase actually results in a decrease in phase) that can lead to incorrect operation. A phase interpolator, on the other hand, sums phases together and thus does not have separate routes for each phase. Thus there is no phase delta caused by phase selection, monotonicity is guaranteed, and a large number of steps can be utilized. In FIG. 8, a total of 64 phases can be generated.

In some embodiments, both the symbol sample in ADC 207 and the zero crossing sample in ADC 207 are implemented as single bits. Consequently, the phase detector has non-linear gain that is amplitude dependent. Such an implementation is known as a "bang-bang" phase detector. This design could use more bits in the zero-crossing input and implement a linear phase detector, which would give better performance in receiver 100 but would be more expensive in terms of power and area. The algorithm would be the same as the chosen implementation except $z_k$ is no longer limited to +/−1.

An alternative to using zero-crossing techniques is to utilize an update algorithm such as a Mueller-Muller update algorithm which relies on the symbol and error information and does not require the zero-crossing signal, which therefore requires less analog circuitry. However, this reduced circuitry comes at the cost of reduced bandwidth and potential interaction issues with the equalizer, depending on the equalizer design. The update algorithm could be:

$$mm_k = mm_{(k-1)} + (e_k * d_{(k-1)} - e_{(k-1)} * d_k) * \alpha_{MM}$$

where $mm_k$ is the Mueller-Muller update at time k, $e_k$ is the error at time k, $d_k$ is the decision at time k, $e_{(k-1)}$ is the decision at time k−1 and $d_{(k-1)}$ is the decision at time (k−1). The loop constant $\alpha_{MM}$ controls the bandwidth of this loop In systems where data is transmitted on multiple channels, successful decoding may rely on compensation for any delay difference or skew experienced between any set of channels. It may also be desirable to compensate for timing differences associated with this skew. As discussed above, the data on each channel may be sampled at different times in order for each channel to be sampled optimally, for example due to small discrepancies in cable length or due to different delays through the analog path. When the data is passed from receiver 100 to higher levels, the data on each channel may be aligned as in the HDMI case. In this case, when the data passed from three independent clock domains to a single clock domain a FIFO can be used at the output of each channel, to ensure the data symbols are synchronized. Additional circuitry may be utilized to align the symbols.

In some embodiments, it is possible to put the receiver paths in multi-channel systems such as in HDMI in a single clock domain. As such, a FIFO can be included after ADC 207 in each of receiver 100. Alternatively, each receiver 120 can have an independent clock domain and a FIFO can be inserted after receivers 120. Such a system can minimize the latency in the digital loops controlling each of receiver 120. Of particular importance is the phase interpolator loop. As mentioned above, this loop has a high bandwidth. Increased latency decreases the maximum gain that can reasonably be used for acceptable performance and maximum bandwidth.

The interaction between various parts of receiver 100 can be orchestrated and monitored by the use of suitable state machines. For example, a state-machine can be implemented to allow receiver 100 an appropriate time to acquire, checking its progress along the way and finally monitoring the state of the link.

In some embodiments, two state-machines can be implemented. The first state-machine can control the locking of timing circuit 110. It tests the various options for the VCO and divider options until a suitable one is found, subsequently checking to ensure that the PLL remains locked. The main state-machine, called the global state-machine or GSM, controls other state-machines and instructs the first state-machine as to which VCO and divider options to try and for how long. Once the PLL is locked, the GSM goes on to perform the locking of the modem and then allows the upper layers to acquire. Once the modem is locked, the GSM continually monitors the status of the link, re-locking the modem or PLL as necessary.

In some embodiments, multiple ones of receiver 100 can be implemented on a single chip. In some embodiments, the single chip can include switching functionality through the use of analog multiplexers in the analog domain, duplicate data paths, and in some cases digital multiplexers in the digital domain. For example, a three-input, two-output HDMI device can be implemented where any of the three inputs can be routed to the two outputs. Such an arrangement allows flexibility in configuring the options on a system. For example, a picture-in-picture arrangement can be implemented in this fashion. Additionally, an option to swap each of the data channels within a single modem, making it simple to perform lane reassignment, for example if a connector is mounted on the underside of a board as opposed to the top side. In this case, only the clock channel needs be rerouted.

In some embodiments, deserializers can be utilized so that the digital core need not operate at a high baud rate. Such use of deserializers makes the digital design process easier, less expensive in terms of power and area, with minimal loss in performance. In some embodiments, deserializers can be utilized to divide a rate by 4. As always, there is a trade off between delay and complexity.

The embodiments of the invention disclosed above are examples only and are not intended to be limiting. One skilled in the art will realize several alternatives to the specific examples disclosed herein. As such, the invention is limited only by the following claims.

What is claimed is:

1. A receiver system for receiving signals, the receiver system comprising:
   a) a timing circuit for frequency locking to the received signals;
   b) a digital clock and data recovery (DCDR) circuit receiving a data stream within the received signals and coupled to the timing circuit to receive timing signals, the DCDR circuit comprising:
      i) an analog equalizer;
      ii) a dc-offset and base-line wander block, coupled to the analog equalizer;
      iii) an analog to digital converter, coupled to the dc-offset and base-line wander block;
      iv) a phase block coupled to the timing circuit, the phase block outputting sampling clock signals for receiving data to the analog to digital converter, the phase block picking the correct phase at which to sample the signal input to the analog to digital converter once the timing circuit has been frequency locked to the received signals;
      v) a control block, coupled to the analog to digital converter and to the timing circuit, the control block digitally controlling each of the analog to digital converter, the dc-offset and base-line wander block and the analog equalizer and the phase block, the control block comprising:
         A) an analog equalizer loop; and
         B) an adder having a first and second input and an output, being coupled to the analog to digital converter and the output providing an error signal coupled to the analog equalizer loop; and
      vi) a slicer, coupled to the control block and providing an a decision output signal from the DCDR and also coupled to the second input of the adder and to the analog equalizer loop;
   wherein the analog equalizer loop uses the error signal output from the adder and the decision output signal from the slicer to generate a control signal to adjust the analog equalizer.

* * * * *